(12) United States Patent
Okuda

(10) Patent No.: US 8,538,021 B2
(45) Date of Patent: Sep. 17, 2013

(54) SENDING APPARATUS, RECEIVING APPARATUS, SENDING METHOD, AND RECEIVING METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 13/025,551

(22) Filed: Feb. 11, 2011

(65) Prior Publication Data

US 2011/0138173 A1 Jun. 9, 2011

Related U.S. Application Data

(63) Continuation of application No. PCT/JP2008/065977, filed on Sep. 4, 2008.

(51) Int. Cl.
*H04L 29/06* (2006.01)

(52) U.S. Cl.
USPC ........................................ 380/259

(58) Field of Classification Search
USPC ........................................ 380/259
See application file for complete search history.

(56) References Cited

U.S. PATENT DOCUMENTS

| | | | |
|---|---|---|---|
| 2003/0044011 A1* | 3/2003 | Vialen et al. | 380/201 |
| 2004/0131014 A1* | 7/2004 | Thompson et al. | 370/230 |
| 2008/0095368 A1* | 4/2008 | Iida et al. | 380/259 |
| 2008/0170691 A1* | 7/2008 | Chang et al. | 380/270 |
| 2009/0220079 A1 | 9/2009 | Harada et al. | |

FOREIGN PATENT DOCUMENTS

| | | |
|---|---|---|
| CN | 1283063 | 2/2001 |
| JP | 05-85140 | 11/1993 |
| JP | 2002-507868 | 3/2002 |
| JP | 2005-176335 | 6/2005 |
| JP | 2006-352490 | 12/2006 |
| WO | 99/48296 | 9/1999 |
| WO | 2007/030074 | 3/2007 |
| WO | 2008/054320 | 5/2008 |
| WO | 2009/026300 | 2/2009 |

OTHER PUBLICATIONS

International Search Report issued for corresponding International Patent Application No. PCT/JP2008/065977, mailed Dec. 2, 2008.
R. Housley; Internet Engineering Task Force (IETF); Vigil Security, RFC4309—Network Working Group Request for Comments: 4309; Category: Standards Track; "Using Advanced Encryption Standard (AES) CCM Mode with IPsec Encapsulating Security Payload (ESP)" Dated: Dec. 2005.

(Continued)

*Primary Examiner* — Jason Gee
(74) *Attorney, Agent, or Firm* — Myers Wolin, LLC

(57) ABSTRACT

A sending apparatus includes an encryption unit and a sending unit. The encryption unit encrypts each of data packets on the basis of a frame number of a frame and a determined cryptographic key. The sending unit transmits a frame including the data packets encrypted. A receiving apparatus includes a receiving unit and a decoding unit. The receiving unit receives the frame. The decoding unit decodes each of the data packets on the basis of the frame number of the frame and a determined decoding key.

10 Claims, 20 Drawing Sheets

(56) References Cited

OTHER PUBLICATIONS

IEEE Computer Society and the IEEE Microwave Theory and Techniques Society, Sponsored by the LAN/MAN Standards Committee; IEEE Std. 802.16-2004; (Revision of IEEE Std. 802.16-2001); "IEEE Standard for Local and metropolitan area networks; Part 16: Air Interface for Fixed Broadband Wireless Access Systems"; IEEE, 3 Park Avenue, New York, NY 10016-5997, USA; Dated Oct. 1, 2004; [Print: SH95246; PDF: SS95246].

IEEE Computer Society and the IEEE Microwave Theory and Techniques Society; Sponsored by the LAN/MAN Standards Committee; IEEE Std. 802.16e-2005 and IEEE Std. 802.16-2004/Cor1-2005 (Amendment and Corrigendum to IEEE Std. 802.16 16-2004); "Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE, 3 Park Avenue, New York, NY 10016-5997, USA; Dated Feb. 28, 2006.

IEEE Computer Society Sponsored by the LAN/MAN Standards Committee; IEEE Standard for Information technology—Telecommunications and information exchange between systems—Local and metropolitan area networks—Specific.requirements; Part11: Wireless LAN Medium Access Control (MAC) and Physical Layer (PHY) Specifications; IEEE Std. 802.11-2007 (Revision of IEEE Std. 802.11-1999); IEEE, 3 Park Avenue, New York, NY 10016-5997, USA; Dated Jun. 12, 2007. [Ref.: ISR mailed Dec. 2, 2008].

Office Action issued for corresponding Japanese Patent Application No. 2010-527622, issued Dec. 25, 2012, with English translation.

First Notification of Office Action issued for corresponding Chinese Patent Application No. 200880130952.8, issued May 30, 2013, with full English translation.

\* cited by examiner

125a

| CID | COMMON KEY | INDEX |
|-----|------------|-------|
| 1 | key#a | 0 |
| 2 | key#b | 3 |
| 3 | key#c | 1 |
| ⋮ | ⋮ | ⋮ |

FIG. 5

| Header (6 Bytes) | Encrypted Payload | ICV (8 Bytes) | CRC (4 Bytes) |

FIG. 7

| Header (6 Bytes) | Index (1 Byte) | Encrypted Payload | ICV (8 Bytes) | CRC (4 Bytes) |

FIG. 8

| Initialization Vector (13 Bytes) | | | |
|---|---|---|---|
| MAC Header (5 Bytes) | Reserved (4 Bytes) | Frame Number (3 Bytes) | Index (1 Byte) |

| CID | COMMON KEY | INDEX | EXTENSION PARAMETER |
|---|---|---|---|
| 1 | key#a | 0 | 0 |
| 2 | key#b | 3 | -2 |
| 3 | key#c | 1 | 4 (0011) |
| ⋮ | ⋮ | ⋮ | ⋮ |

| CID | COMMON KEY | INDEX | PDU NUMBER |
|---|---|---|---|
| 1 | key#a | 0 | 200 |
| 2 | key#b | 3 | 10 |
| 3 | key#c | 1 | 150 |
| ⋮ | ⋮ | ⋮ | ⋮ |

FIG. 19

SENDING APPARATUS, RECEIVING APPARATUS, SENDING METHOD, AND RECEIVING METHOD

This application is a continuing application, filed under 35 U.S.C. §111(a), of International Application PCT/JP2008/065977, filed on Sep. 4, 2008, now pending, the contents of which are herein wholly incorporated by reference.

FIELD

The embodiments discussed herein are related to a sending apparatus, a receiving apparatus, a sending method, and a receiving method.

BACKGROUND

At present, packet communication in which data is transmitted or received by the packet is widely used. With packet communication, data can be encrypted by the packet in order to ensure data security and integrity. In the field of IP (Internet Protocol) packet communication, for example, the technique of IPsec for encrypting an IP data packet by a common key cryptosystem and transmitting it is known (see, for example, (literature 1) Internet Engineering Task Force (IETF), "Using Advanced Encryption Standard (AES) CCM Mode with IPsec Encapsulating Security Payload (ESP)", RFC 4309.). In the field of fixed radio communication or mobile radio communication a technique for encrypting a data packet by a common key cryptosystem is also known (see, for example, (literature 2) The Institute of Electrical and Electronics Engineers (IEEE), "IEEE Standard for Local and Metropolitan Area Networks Part 16: Air Interface for Fixed Broadband Wireless Access Systems", IEEE802.16-2004. or (literature 3) The Institute of Electrical and Electronics Engineers (IEEE), "IEEE Standard for Local and Metropolitan Area Networks Part 16: Air Interface for Fixed and Mobile Broadband Wireless Access Systems", IEEE802.16e-2005.).

A data packet can be transmitted by mapping it to a frame which is a determined communication unit in a lower communication layer. With radio communication, for example, a data packet can be mapped to a radio frame in a physical layer. One or more data packets can be included in a frame.

By the way, some encryption methods use a bit string called an initialization vector in addition to a cryptographic key. Even if plaintexts (data before encryption) are the same and cryptographic keys are the same, different cryptograms (data after encryption) can be obtained by the use of different initialization vectors. That is to say, a decrease in safety caused by the repetitive use of the same cryptographic key can be prevented by the use of an initialization vector.

With the techniques described in the above literature 1 through 3, a data packet is encrypted at a sending end by the use of a common key and an initialization vector generated for each specific data packet. Information (4-byte bit string, for example) regarding the initialization vector used for the encryption is added to the encrypted data packet and is transmitted from the sending end. With this method, however, data packet encryption causes an increase in the amount of communication.

SUMMARY

According to an aspect of the present invention, there is provided a sending apparatus for transmitting a frame including one or more data packets, including an encryption unit which encrypts each of the data packets on the basis of a frame number of the frame used for transmitting the data packets and a determined cryptographic key and a sending unit which transmits the frame including the data packets encrypted by the encryption unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a first example of the structure of a key management table;
FIG. 7 illustrates a first example of the format of a MAC-PDU;
FIG. 8 illustrates a second example of the format of a MAC-PDU;
FIG. 11 illustrates a first example of an initialization vector;
FIG. 16 illustrates a second example of the structure of a key management table;
FIG. 19 illustrates a third example of the structure of a key management table.

DESCRIPTION OF EMBODIMENTS

Figure 1:
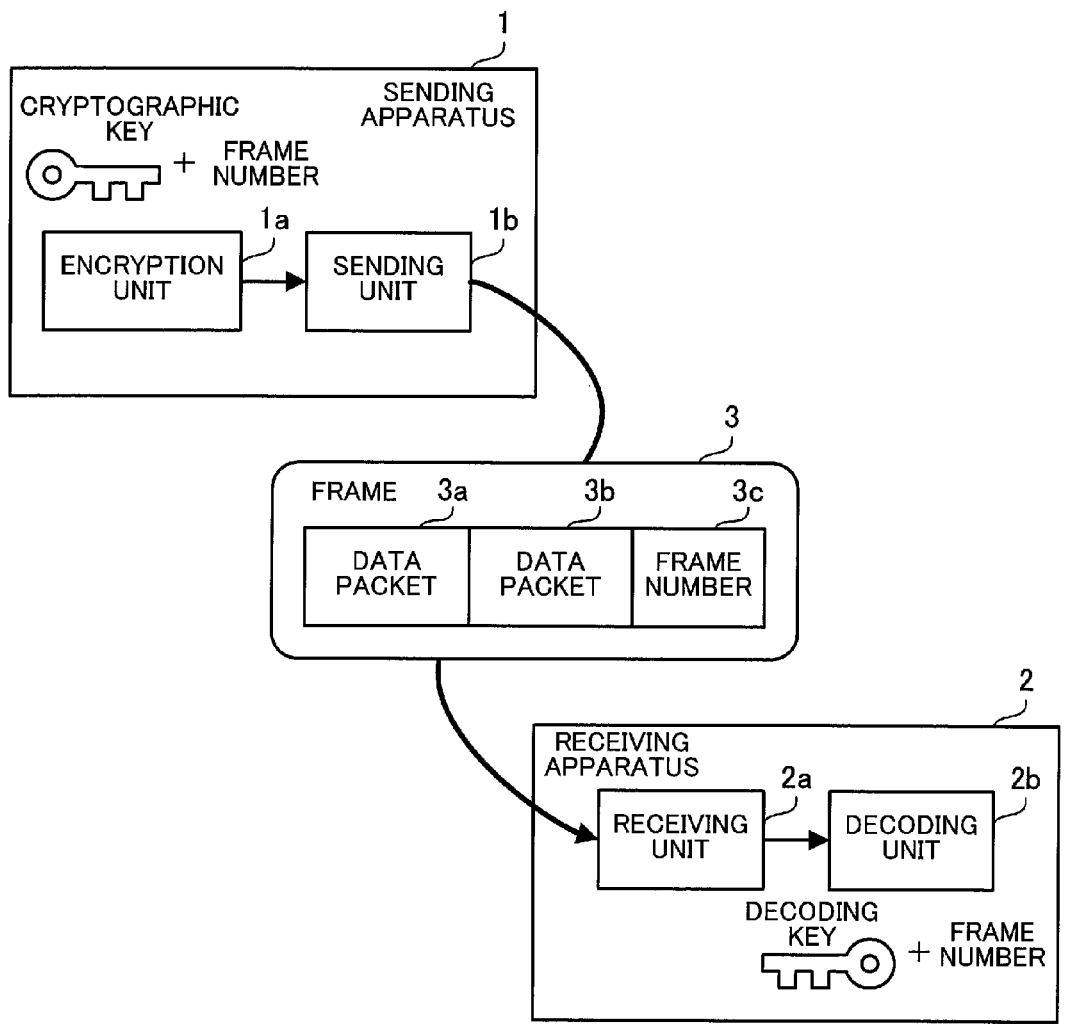
FIG. 1 illustrates a sending apparatus and a receiving apparatus.

Embodiments of the present invention will now be described in detail with reference to the accompanying drawings, wherein like reference numerals refer to like elements throughout.

FIG. 1 illustrates a sending apparatus and a receiving apparatus. A sending apparatus 1 sends a frame 3 and a receiving apparatus 2 receives the frame 3 from the sending apparatus 1. One or more data packets can be included in the frame 3. In the example of FIG. 1, the frame 3 includes data packets 3a and 3b.

The sending apparatus 1 includes an encryption unit 1a and a sending unit 1b. The encryption unit 1a encrypts the data packets 3a and 3b. A cryptographic key held by the sending apparatus 1 is used for the encryption. The cryptographic key corresponds to a decoding key held by, for example, the receiving apparatus 2. In addition, a frame number 3c of the frame 3 used for sending the data packets 3a and 3b is used for the encryption. The frame number 3c is used for generating, for example, an initialization vector. The sending unit 1b sends the frame 3 including the data packets 3a and 3b encrypted by the encryption unit 1a.

The receiving apparatus 2 includes a receiving unit 2a and a decoding unit 2b. The receiving unit 2a receives the frame 3 from the sending apparatus 1. The decoding unit 2b decodes the data packets 3a and 3b included in the frame 3 received by the receiving unit 2a. A decoding key held by the receiving apparatus 2 is used for the decoding. The decoding key corresponds to the cryptographic key held by, for example, the sending apparatus 1. In addition, the frame number 3c of the frame 3 used for sending the data packets 3a and 3b is used for the decoding. The frame number 3c is used for generating, for example, the initialization vector.

The frame number 3c is a number for identifying each frame and is defined by, for example, the sending apparatus 1 or the receiving apparatus 2. A serial number which increments by one for each frame can be used as the frame number 3c. The frame number 3c may be included in the frame 3. In this case, the receiving apparatus 2 can extract the frame number 3c from the frame 3 and use it for the decoding. However, the receiving apparatus 2 may manage a current frame number and perform the decoding on the basis of the frame number it manages.

In addition, the sending apparatus 1 and the receiving apparatus 2 can use a common key cryptosystem or a public key cryptosystem as a cryptographic algorithm. DES (Data Encryption Standard), AES (Advanced Encryption Standard), or the like adopts the common key cryptosystem. With the common key cryptosystem the cryptographic key used in the sending apparatus 1 and the decoding key used in the receiving apparatus 2 are the same (common key). With the public key cryptosystem, on the other hand, the cryptographic key used in the sending apparatus 1 and the decoding key used in the receiving apparatus 2 are different (public key and secret key). With the common key cryptosystem the sending apparatus 1 and the receiving apparatus 2 agree in advance on a common key used as the cryptographic key and the decoding key.

The sending apparatus 1 and the receiving apparatus 2 can change the cryptographic key and the decoding key, respectively, on a regular or irregular basis. It is desirable from the viewpoint of the safety of cryptograph that the sending apparatus 1 and the receiving apparatus 2 should change the cryptographic key and the decoding key, respectively, at least once every circulation cycle especially in the case where a frame number circulates in a determined cycle (for example, in the case where a number increments by one for each frame and returns to a minimum value after reaching a representable maximum value). The sending apparatus 1 and the receiving apparatus 2 may change the cryptographic key and the decoding key, respectively, according to the number of data packets encrypted and decoded.

It is possible to mingle a data packet encrypted and a data packet not encrypted in the frame 3. In the above example the sending apparatus 1 communicates with the receiving apparatus 2 on a one-to-one basis. However, the sending apparatus 1 may send data packets to a plurality of receiving apparatus 2. In this case, it is possible to mingle the data packets to be sent to the plurality of receiving apparatus 2 in the frame 3. In addition, a plurality of sending apparatus 1 may send data packets to the receiving apparatus 2. In this case, it is possible to mingle the data packets sent from the plurality of sending apparatus 1 in the frame 3.

Furthermore, in addition to the cryptographic key or the decoding key and the frame number 3c, an index indicative of the position of a data packet in the frame 3 may be used for encrypting or decoding the data packet. For example, the index is a number indicative of where the data packet is in the frame 3. An initialization vector may be generated from the frame number 3c and the index. The sending apparatus 1 may add an index to each of the data packets 3a and 3b and send it.

Only part of a bit string indicative of the frame number 3c may be extracted and used for performing encryption or decoding. Moreover, a bit string obtained by adding an extension bit to a bit string indicative of the frame number 3c may be used. Such extension or shrinkage of a bit string indicative of the frame number 3c is effective especially in the case where the cryptographic key and the decoding key are changed in a cycle different from the circulation cycle of the frame number 3c. A use for the frame number 3c or the above index is not limited to initialization vector generation. For example, a bit string in which the cryptographic key or the decoding key and the frame number 3c are combined may be used as a temporary cryptographic key or decoding key.

With the above sending apparatus 1 the data packets 3a and 3b are encrypted by the encryption unit 1a on the basis of the frame number 3c of the frame 3 used for sending them and the cryptographic key. The sending unit 1b then sends the frame 3 including the data packets 3a and 3b encrypted. With the above receiving apparatus 2 the receiving unit 2a receives the frame 3 including the data packets 3a and 3b. The decoding unit 2b then decodes the data packets 3a and 3b included in the frame 3 received on the basis of the frame number 3c of the frame 3 and the decoding key.

Accordingly, it is not necessary for the sending apparatus 1 to add information other than the decoding key which the receiving apparatus 2 uses for decoding the data packets 3a and 3b to the data packets 3a and 3b or to send it. The receiving apparatus 2 can obtain information other than the decoding key used for decoding from the frame number 3c of the frame 3 used for sending the data packets 3a and 3b. This prevents an increase in the amount of communication caused by the encryption of the data packets 3a and 3b.

The case where the above sending method and receiving method are applied to a mobile communication system will now be described in further detail. However, the above sending method and receiving method can also be applied to other kinds of communication systems such as a fixed radio communication system and a wired communication system. In addition, with the following mobile communication system a data packet is encrypted both for communication (uplink communication) from a mobile station to a base station and for communication (downlink communication) from a base station to a mobile station. However, encryption may be performed only for up or downlink communication.

First Embodiment

Figure 2:
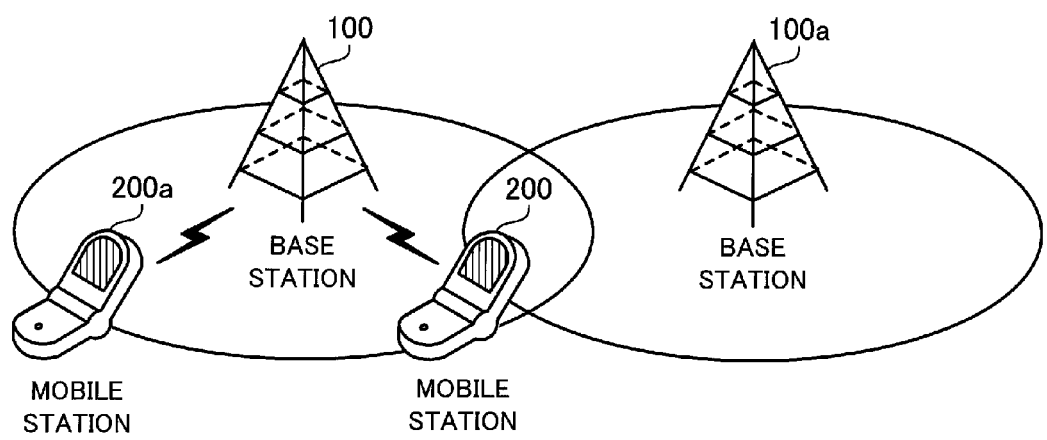
FIG. 2 illustrates the structure of a mobile communication system.

FIG. 2 illustrates the structure of a mobile communication system. A mobile communication system according to a first embodiment includes base stations 100 and 100a and mobile stations 200 and 200a.

Each of the base stations 100 and 100a is a radio communication apparatus. When the mobile station 200 or 200a is in a cell of the base station 100 or 100a, the base station 100 or 100a can perform packet communication with the mobile station 200 or 200a. The base station 100 or 100a sends a data packet the destination of which is the mobile station 200 or 200a via a downlink (radio link from the base station 100 or 100a to the mobile station 200 or 200a). In addition, the base station 100 or 100a receives a data packet sent by the mobile station 200 or 200a via an uplink (radio link from the mobile station 200 or 200a to the base station 100 or 100a). The base stations 100 and 100a can communicate with each other via an upper station (not illustrated) such as a radio network controller. However, the base stations 100 and 100a can communicate directly with each other.

Each of the mobile stations 200 and 200a is a radio terminal unit and can perform packet communication with the base station 100 or 100a. For example, each of the mobile stations 200 and 200a is a portable telephone. The mobile station 200 or 200a sends a data packet to the base station 100 or 100a via an uplink. In addition, the mobile station 200 or 200a receives a data packet the destination of which is the mobile station 200 or 200a from the base station 100 or 100a via a downlink. In the first embodiment it is assumed that the mobile station 200 is in a cell of the base station 100.

In order to ensure data security and integrity, each of the base stations 100 and 100a and the mobile stations 200 and 200a can encrypt and transmit a data packet and receive an encrypted data packet. In the case of a downlink, the base station 100 or 100a corresponds to the sending apparatus 1 illustrated in FIG. 1 and the mobile station 200 or 200a corresponds to the receiving apparatus 2 illustrated in FIG. 1. In the case of an uplink, the mobile station 200 or 200a corresponds to the sending apparatus 1 and the base station 100 or 100a corresponds to the receiving apparatus 2.

In this embodiment it is assumed that AES-CCM (Counter with CBC MAC) is used as a cryptograph processing method. With AES-CCM, AES which is a common key cryptosystem is used as a cryptographic algorithm. A counter mode (CTR mode) is used as a cryptograph usage mode. In addition, a MAC (Message Authentication Code) generated in a CBC (Cipher Block Chaining) mode is added to a data packet. The details of AES-CCM will be described later. However, the base stations 100 and 100a and the mobile stations 200 and 200a may use a cryptograph processing method other than AES-CCM.

Figure 3:
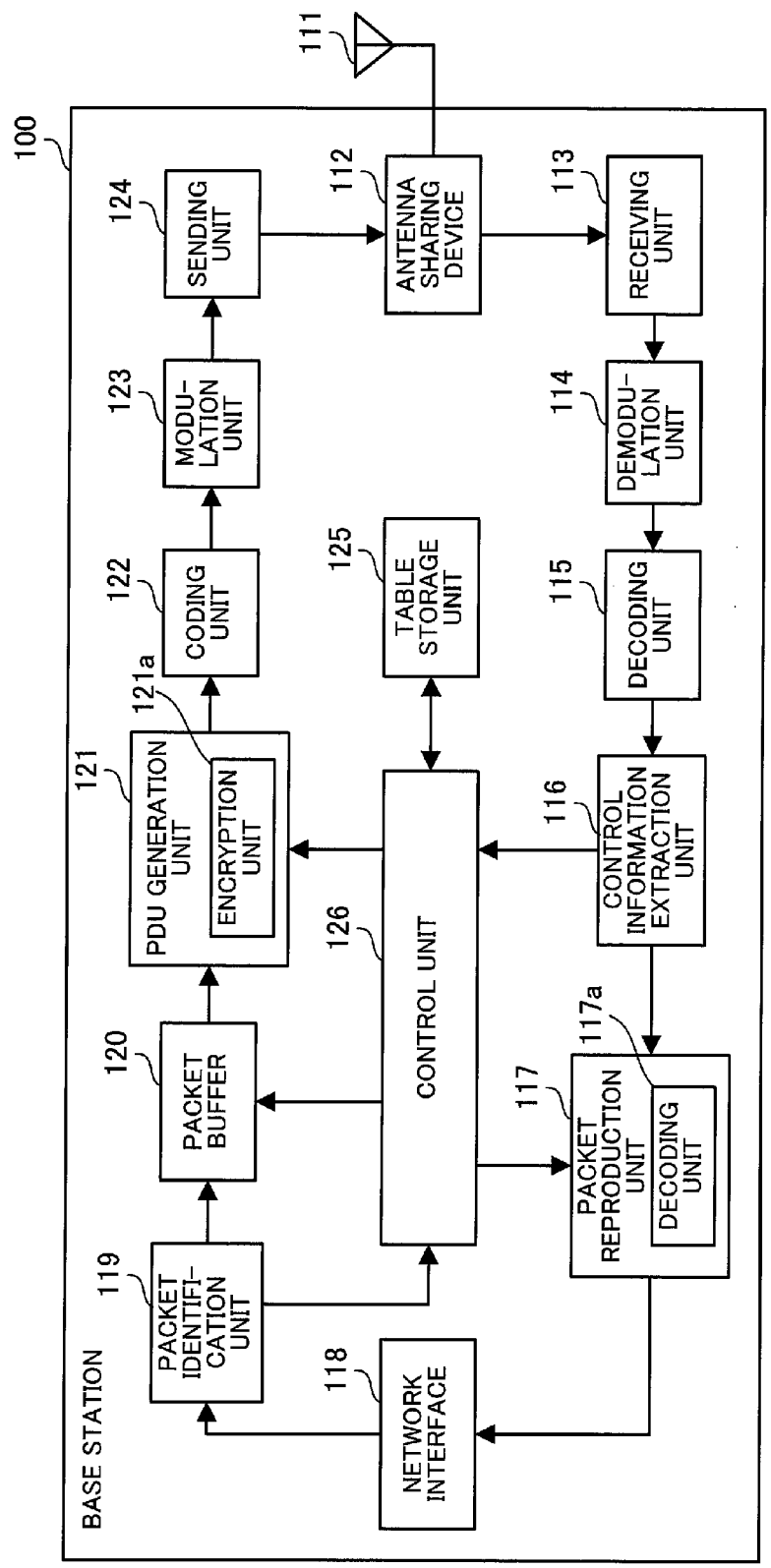
FIG. 3 is a block diagram of a base station.

FIG. 3 is a block diagram of the base station. The base station 100 includes an antenna 111, an antenna sharing device 112, a receiving unit 113, a demodulation unit 114, a decoding unit 115, a control information extraction unit 116, a packet reproduction unit 117, a network interface 118, a packet identification unit 119, a packet buffer 120, a PDU generation unit 121, a coding unit 122, a modulation unit 123, a sending unit 124, a table storage unit 125, and a control unit 126. The base station 100a can also be realized by the same module structure that is adopted in the base station 100.

The antenna 111 is used both for sending and for receiving. The antenna 111 outputs a radio signal received from the mobile station 200 or 200a to the antenna sharing device 112. In addition, the antenna 111 radio-outputs a transmitted signal acquired from the antenna sharing device 112. However, a sending antenna and a receiving antenna which are distinct from each other may be used.

The antenna sharing device 112 separates the received signal and the transmitted signal for using the antenna 111 both for sending and for receiving. The antenna sharing device 112 outputs the received signal acquired from the antenna 111 to the receiving unit 113. In addition, the antenna sharing device 112 makes the antenna 111 radio-output the transmitted signal acquired from the sending unit 124. The antenna sharing device 112 includes, for an example of FDD (Frequency Division Duplex), a BPF (Band Pass Filter) for separating the received signal and the transmitted signal.

The receiving unit 113 converts the received signal acquired from the antenna sharing device 112 to a digital base band signal and outputs the digital base band signal to the demodulation unit 114. In order to perform this conversion process, the receiving unit 113 includes a LNA (Low Noise Amplifier), a frequency converter, a BPF, an A/D (Analog-to-Digital) converter, a quadrature demodulator, and the like.

The demodulation unit 114 demodulates the digital base band signal acquired from the receiving unit 113. In this case, a determined demodulation method or a demodulation method designated by the control unit 126 is used. The demodulation unit 114 then outputs a demodulated signal obtained to the decoding unit 115.

The decoding unit 115 decodes the demodulated signal acquired from the demodulation unit 114. For example, the decoding unit 115 performs a process including deinterleaving, error correction decoding, error detection, and the like on the demodulated signal. In this case, a determined decoding method or a decoding method designated by the control unit 126 is used. The decoding unit 115 then outputs decoded data obtained to the control information extraction unit 116.

The control information extraction unit 116 extracts control information generated by the mobile station 200 or 200a from the decoded data acquired from the decoding unit 115, and outputs the control information to the control unit 126. The control information includes a SBC-REQ (Subscriber station Basic Capability-REQuest) for sending notice of the communication capability of the mobile station 200 or 200a, a PKM-REQ (Privacy Key Management-REQuest) for requesting a new common key, and the like. In addition, the control information extraction unit 116 extracts user data from the decoded data acquired from the decoding unit 115, and outputs the user data to the packet reproduction unit 117.

The packet reproduction unit 117 acquires the user data from the control information extraction unit 116 and converts the data format of MAC-PDU (Medium Access Control-Protocol Data Unit) used in a radio interval to a packet format used in communication between the upper station and the base station. At this time it is possible to combine MAC-PDUs or divide a MAC-PDU at need. The packet reproduction unit 117 then outputs a data packet to the network interface 118.

The packet reproduction unit 117 includes a decoding unit 117a. If there is an encrypted MAC-PDU, then the decoding unit 117a decodes the MAC-PDU. At this time the decoding unit 117a acquires a frame number of a radio frame in which the MAC-PDU to be decoded is included, an index indicative of the position of the MAC-PDU in the radio frame, and a common key (decoding key) from the control unit 126. The decoding unit 117a then decodes the MAC-PDU on the basis of the information acquired from the control unit 126. The details of a decoding method will be described later.

The network interface 118 is a communication interface for performing packet communication with the upper station. The network interface 118 sends the upper station the data packet acquired from the packet reproduction unit 117. In addition, the network interface 118 outputs a data packet acquired from the upper station to the packet identification unit 119.

The packet identification unit 119 outputs the data packet acquired from the network interface 118 to the packet buffer 120. At this time the packet identification unit 119 specifies a destination mobile station from a destination address (destination IP (Internet Protocol) address, for example) included in a header of the data packet. This can be realized, for example, in the following way. The packet identification unit 119 associates an address with identification information for each mobile station and manages them. The packet identification unit 119 also determines QoS (Quality of Service) corresponding to the specified mobile station. The packet identification unit 119 then designates the mobile station, the QoS, and the size of the data packet and requests the control unit 126 to assign a band.

The packet buffer 120 is a buffer memory and temporarily stores the data packet acquired from the packet identification unit 119. In accordance with instructions from the control unit 126 the packet buffer 120 outputs stored data packets to the PDU generation unit 121. The packet buffer 120 manages data packets according to their destinations or QoS, so the packet buffer 120 can divide its storage area into a plurality of areas. Furthermore, the packet buffer 120 may include a plurality of memory units.

The PDU generation unit 121 acquires a data packet including user data from the packet buffer 120 and acquires control information from the control unit 126. The control information includes a response to a SBC-REQ, a response to a PKM-REQ, and the like. The PDU generation unit 121 converts the data packet to the MAC-PDU format while exercising control so as to properly arrange the user data and the control information in a radio frame. At this time the PDU generation unit 121 can combine data packets or divide the data packet at need. The PDU generation unit 121 then codes the MAC-PDU and the control information and outputs them to the coding unit 122.

The PDU generation unit 121 includes an encryption unit 121a. In accordance with instructions from the control unit 126 the encryption unit 121a encrypts the data packet. At this time the encryption unit 121a acquires a frame number of the radio frame used for sending the encrypted MAC-PDU, an index indicative of the position of the MAC-PDU in the radio frame, and a common key (cryptographic key) from the control unit 126. The encryption unit 121a then encrypts the data packet on the basis of the information acquired from the control unit 126. The details of an encryption method will be described later.

The coding unit 122 codes the MAC-PDU acquired from the PDU generation unit 121. For example, the coding unit 122 performs a process including adding parity for error detection, error correction coding, and interleaving on the MAC-PDU. In this case, a determined coding method or a coding method designated by the control unit 126 is used. The coding unit 122 then outputs coded data obtained to the modulation unit 123.

The modulation unit 123 modulates the coded data acquired from the coding unit 122. In this case, a determined modulation method or a modulation method designated by the control unit 126 is used. For example, the modulation unit 123 performs digital modulation such as QPSK (Quadrature Phase Shift Keying) or 16QAM (Quadrature Amplitude Modulation). The modulation unit 123 then outputs a digital base band signal obtained to the sending unit 124.

The sending unit 124 converts the digital base band signal acquired from the modulation unit 123 to a transmitted signal for radio-transmitting and outputs it to the antenna sharing device 112. In order to perform this conversion process, the sending unit 124 includes a quadrature modulator, a D/A (Digital-to-Analog) converter, a frequency converter, a BPF, a power amplifier, and the like.

The table storage unit 125 stores a key management table for managing a common key (which is a cryptographic key and a decoding key) used for communicating with the mobile station 200 or 200a. In addition, the table storage unit 125 stores various pieces of information, such as information regarding the communication capability of the mobile station 200 or 200a, authentication information, QoS information, and radio resource allocation information, used for communication control. Information stored in the table storage unit 125 is referred to or updated properly by the control unit 126.

The control unit 126 controls the whole of radio communication with the mobile station 200 or 200a. For example, the control unit 126 manages the frame number of a radio frame. In addition, the control unit 126 manages the update of the common key used for communicating with the mobile station 200 or 200a. When the decoding unit 117a decodes the encrypted MAC-PDU, the control unit 126 informs the decoding unit 117a of the frame number, the index, and the common key. Furthermore, when the encryption unit 121a encrypts the data packet, the control unit 126 informs the encryption unit 121a of the frame number, the index, and the common key. The same common key may be used for up and downlinks. Alternatively, different common keys may be used for up and downlinks.

Moreover, when the packet identification unit 119 requests the control unit 126 to allocate a band, the control unit 126 allocates a radio resource to the mobile station 200 or 200a according to QoS. The control unit 126 then gives the packet buffer 120 instructions according to an allocation result to output a data packet. The control unit 126 exercises the above various kinds of control on the basis of control information acquired from the control information extraction unit 116. In addition, the control unit 126 generates control information at need and outputs it to the PDU generation unit 121.

Figure 4:
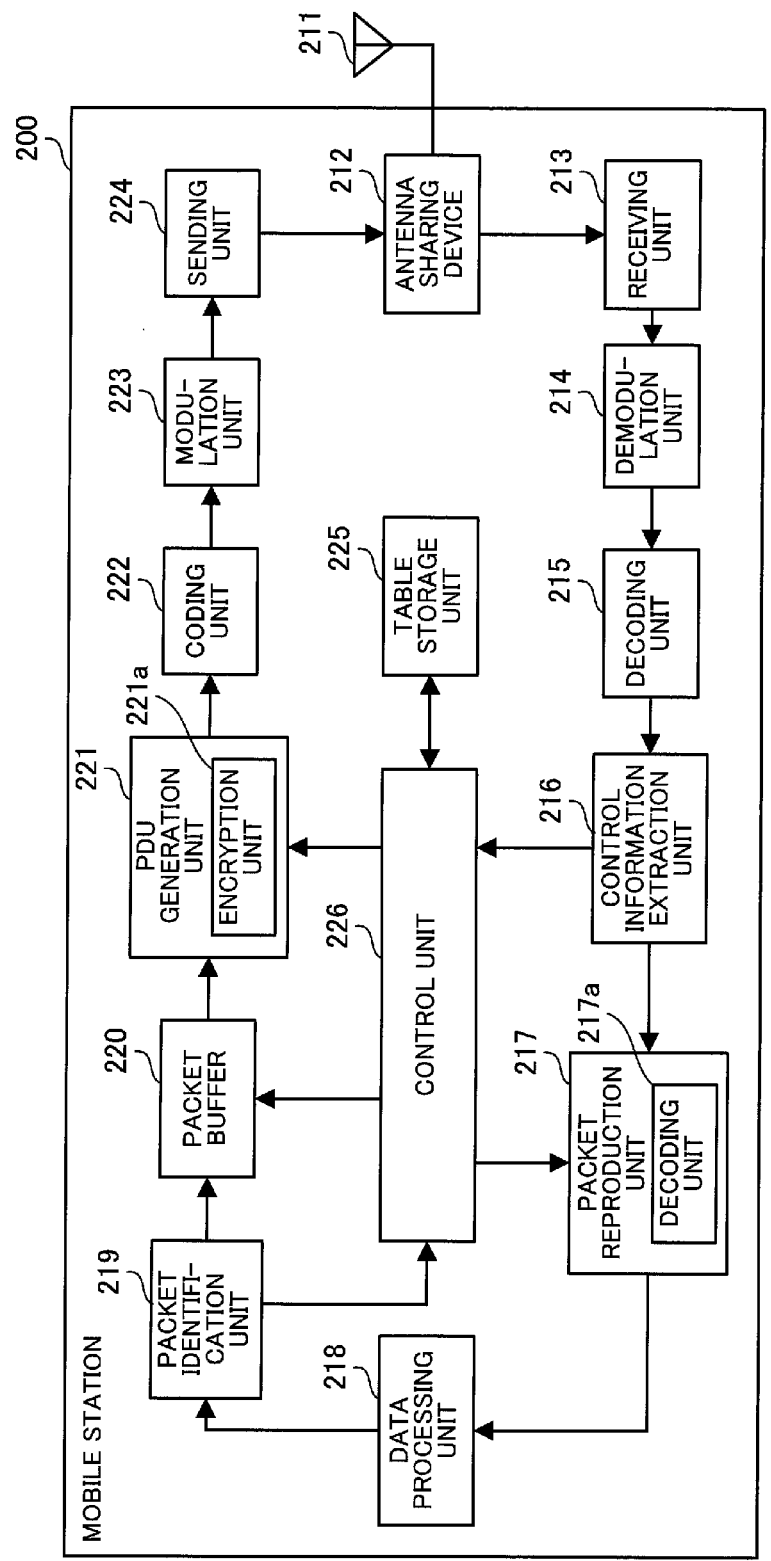
FIG. 4 is a block diagram of a mobile station.

FIG. 4 is a block diagram of the mobile station. The mobile station 200 includes an antenna 211, an antenna sharing device 212, a receiving unit 213, a demodulation unit 214, a decoding unit 215, a control information extraction unit 216, a packet reproduction unit 217, a data processing unit 218, a packet identification unit 219, a packet buffer 220, a PDU generation unit 221, a coding unit 222, a modulation unit 223, a sending unit 224, a table storage unit 225, and a control unit 226. The mobile station 200a can also be realized by the same module structure that is adopted in the mobile station 200.

The functions of the above modules other than the data processing unit 218 are the same as those of the modules of the above base station 100 having the same names. With the mobile communication system according to this embodiment, however, it is assumed that the management of radio resource allocation is performed at the base station side. Accordingly, the mobile station 200 performs uplink communication by the use of a radio resource allocated by the base station 100 or 100a. For example, the mobile station 200 sends the base station 100 or 100a control information indicative of a band request so that the base station 100 or 100a will allocate a radio resource to the mobile station 200.

The data processing unit 218 performs various kinds of data processing, such as a display process and an audio output process, by the use of a data packet acquired from the packet reproduction unit 217. When data to be transmitted emerges, the data processing unit 218 generates a data packet, adds a destination address to the data packet, and outputs the data packet to the packet identification unit 219.

The mobile station 200 may communicate with only one base station or communicate with a plurality of base stations in parallel at each timing. In addition, the mobile station 200 may establish only one connection with one base station or establish a plurality of connections with one base station. A common key used for encrypting and decoding a data packet is prepared for, for example, each connection. In this case, key management is performed for each connection.

FIG. 5 illustrates a first example of the structure of a key management table. A key management table 125a is stored in the table storage unit 125 of the base station 100. A table which is the same as the key management table 125a is also stored in the table storage unit 225 of the mobile station 200. The key management table 125a includes CID (Connection IDentifier), Common Key, and Index items. Pieces of information in these items arranged in the horizontal direction are associated with one another.

An identifier which the base station 100 or 100a assigns to the mobile station 200 or 200a at the time of establish a connection is set in the CID item. A plurality of CIDs may be assigned to one mobile station.

A common key (which is a cryptographic key and a decoding key) used for a connection indicated by a CID is set in the Common Key item. A common key is a determined-length (16-byte (128-bit), for example) bit string. The bit length of a common key is determined according to a cryptographic algorithm used.

The number of times a corresponding common key is used for each radio frame is set in the Index item. An index is a determined-length (1-byte (8-bit), for example) bit string. An index is initialized to zero in each radio frame and is incremented each time the common key is used for encrypting a data packet. Instead of defining an index for each common key, a unique index may be defined for a plurality of common keys.

Information in the key management table 125a is updated properly by the control unit 126. For example, the information of the CID "1," the common key "Key#a," and the index "0" is registered in the key management table 125a. This information means that the common key "Key#a" is unused in a radio frame, that is to say, that no data packet is encrypted in a connection indicated by the CID "1." A table like the key management table 125a is prepared, for example, for each of up and downlinks.

Figure 6:
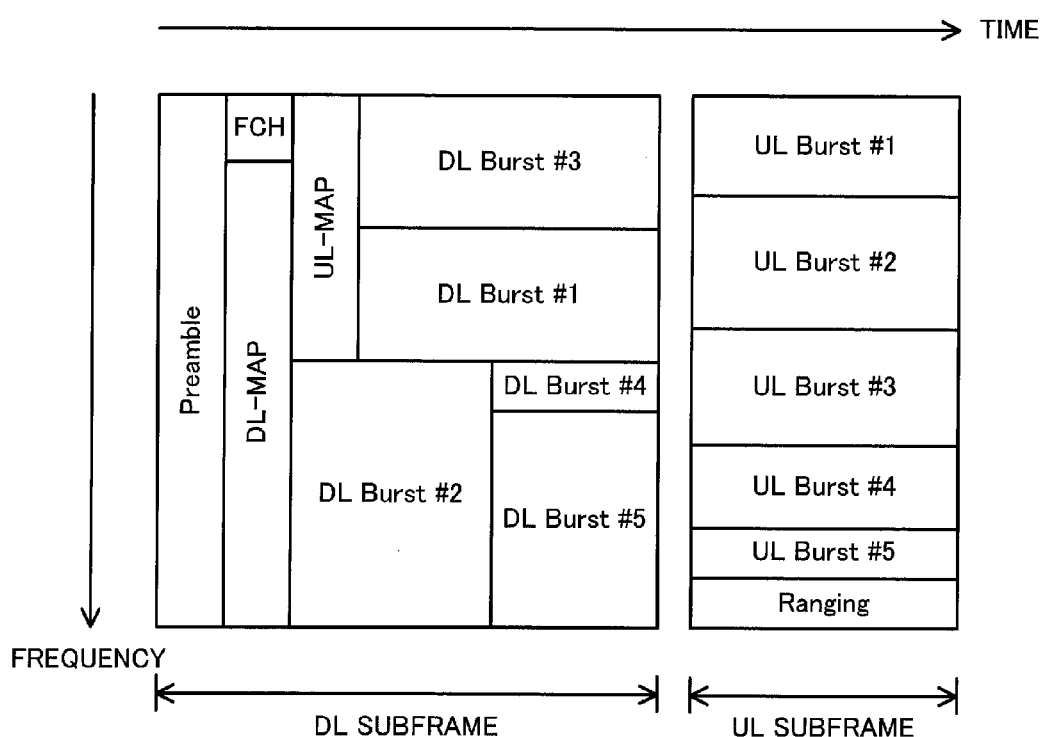
FIG. 6 illustrates an example of the structure of a radio frame.

FIG. 6 illustrates an example of the structure of a radio frame. A radio frame like that illustrated in FIG. 6 is used for radio communication between the base station 100 or 100a and the mobile station 200 or 200a. With the mobile communication system according to this embodiment uplink communication and downlink communication are realized by a TDD (Time Division Duplex) method. That is to say, each radio frame is divided into two time domains, the first half is a DL (downlink) subframe used for downlink communication, and the second half is a UL (uplink) subframe used for uplink communication. However, uplink communication and downlink communication can be realized by a FDD (Frequency Division Duplex) method.

In this example, a preamble is transmitted first in the DL subframe as a known signal for identifying the head of the radio frame. Following the preamble, a FCH (Frame Control Header) indicative of a DL-MAP area is transmitted. Following the FCH, a DL-MAP is transmitted. The DL-MAP includes information which indicates how a radio resource in the DL subframe is assigned to each mobile station. Following the DL-MAP, a UL-MAP is transmitted. The UL-MAP includes information which indicates how a radio resource included in the UL subframe is assigned to each mobile station.

The DL-MAP also includes a frame number of the radio frame. A frame number is a determined-length (3-byte (24-bit), for example) bit string. Serial frame numbers are given in ascending order to a series of radio frames. A frame number circulates in a determined cycle. For example, when a frame number reaches a maximum value which can be represented by 24 bits, the frame number of the next radio frame returns to zero. There is no need to transmit frame numbers by DL-MAPS included in all radio frames. That is to say, frame numbers may be transmitted intermittently. The reason for this is that if frame numbers are given in accordance with a determined rule, the frame number of a current radio frame can be inferred from a frame number transmitted in the past.

Following the UL-MAP, sets of user data and control information are transmitted as DL-Bursts. One or more MAC-PDUs can be included in a DL-Burst. A MAC-PDU encrypted and a MAC-PDU not encrypted may mingle in a DL-Burst. The destination of a MAC-PDU can be specified by a CID included in the DL-MAP or a header of the MAC-PDU.

The UL subframe includes a ranging area for transmitting a ranging code. The mobile station 200 or 200a can perform ranging code transmission without the permission of the base station 100 or 100a in the ranging area. The ranging area can be used for communication before establishing a connection, a band request, a hand-over request, or the like.

In addition, the UL subframe includes UL-Burst areas. The mobile station 200 or 200a can transmit a set of user data and control information in an area assigned thereto as a UL-Burst. One or more MAC-PDUs can be included in a UL-Burst. A MAC-PDU encrypted and a MAC-PDU not encrypted may mingle in a UL-Burst.

A blank referred to as a TTG (Transmit/Receive Transition Gap) is inserted between the DL subframe and the UL subframe. In addition, a blank referred to as a RTG (Receive/Transmit Transition Gap) is inserted between the UL subframe and the next DL subframe.

FIG. 7 illustrates a first example of the format of a MAC-PDU. This MAC-PDU is encrypted. In the first example, the MAC-PDU includes a 6-byte header, an encrypted payload, an 8-byte ICV (Integrity Check Value), and a 4-byte CRC (Cyclic Redundancy Check).

The header is information added for encapsulating a data packet in a MAC layer. The header includes a 1-byte HCS (Header Check Sequence) for error detection. The payload is the encrypted contents of the data packet and has variable length. The ICV is authentication data generated from the contents of the data packet before the encryption. At a receiving end, the ICV can be used for checking whether the data packet is falsified or not. The ICV may be encrypted like the payload or may not be encrypted. The CRC is a bit string for detecting an error in the whole of the MAC-PDU added in the MAC layer.

FIG. 8 illustrates a second example of the format of a MAC-PDU. Like the MAC-PDU illustrated in FIG. 7, this MAC-PDU is encrypted. In the second example, the MAC-PDU includes a 6-byte header, a 1-byte index, an encrypted payload, an 8-byte ICV, and a 4-byte CRC.

The meanings of the header, the payload, the ICV, and the CRC are the same as those of the header, the payload, the ICV, and the CRC included in the MAC-PDU illustrated in FIG. 7. The meaning of the index is as described in the above key management table 125a. That is to say, a number indicative of where the encrypted MAC-PDU is in a radio frame is added to the encrypted MAC-PDU. As a result, at a receiving end it is possible to decode each MAC-PDU without being aware of the order in which MAC-PDUs are stored in the radio frame.

With an uplink, the mobile station 200 or 200a generates and transmits the above MAC-PDU and the base station 100 or 100a receives and decodes it. With a downlink, the base station 100 or 100a generates and transmits the above MAC-PDU and the mobile station 200 or 200a receives and decodes it. However, the ICV may be omitted.

Processes performed in the mobile communication system having the above structure will now be described in detail. The flow of control messages between the base station 100 or 100a and the mobile station 200 or 200a will be described first. A process for encrypting and decoding a data packet will be described next. After that, a process for updating a cryptographic key will be described.

Figure 9:
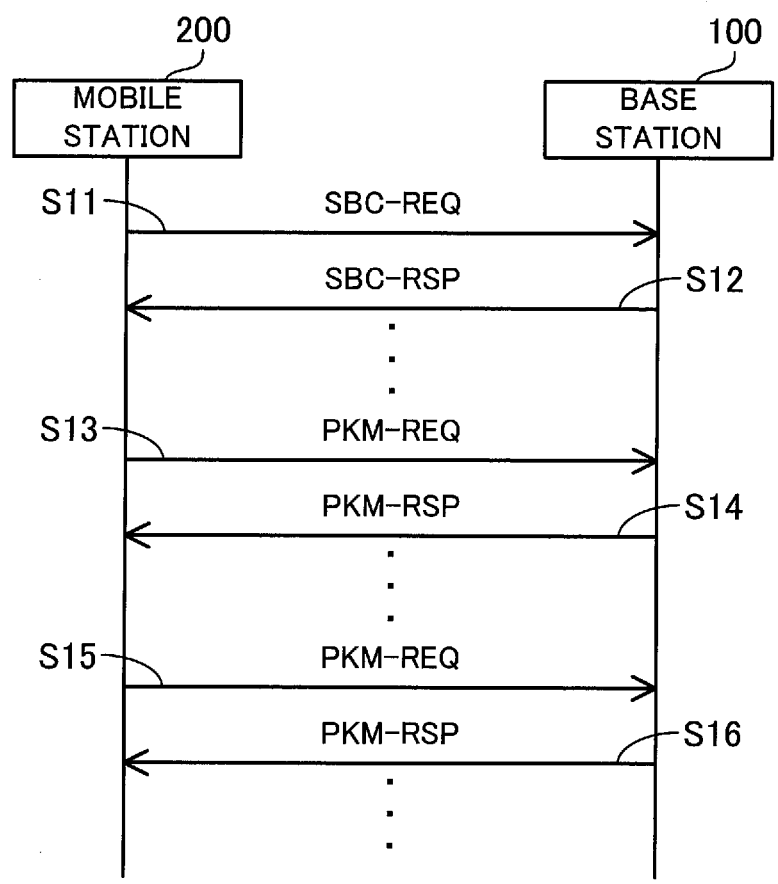
FIG. 9 is a sequence diagram of the flow of control messages.

FIG. 9 is a sequence diagram of the flow of control messages. It is assumed that the mobile station 200 makes a connection with the base station 100. The process illustrated in FIG. 9 will now be described in order of step number.

(Step S11) The mobile station 200 transmits control information (SBC-REQ) indicative of its communication capability to the base station 100. Information regarding a cryptographic algorithm which the mobile station 200 can use can be included in the SBC-REQ. The mobile station 200 transmits the SBC-REQ by the use of, for example, a UL-burst of a radio frame.

(Step S12) The base station 100 transmits control information (SBC-RSP) indicative of a response to the SBC-REQ to the mobile station 200. Information regarding the designation of a cryptographic algorithm to be used can be included in the SBC-RSP. In addition, information indicative of what information is added to an encrypted MAC-PDU (whether an index is added to an encrypted MAC-PDU, for example) can be included in the SBC-RSP. The base station 100 transmits the SBC-RSP by the use of, for example, a DL-burst of a radio frame.

(Step S13) After SBC message exchange and authentication if necessary, the mobile station 200 transmits control information (PKM-REQ) by which a request to distribute a common key is made to the base station 100. The mobile station 200 transmits the PKM-REQ by the use of, for example, a UL-burst of a radio frame.

(Step S14) The base station 100 generates a common key and registers it in a table. The base station 100 then transmits control information (PKM-RSP) which indicates a response to the PKM-REQ and which includes the common key to the mobile station 200. In addition, information regarding an available period can be included in the PKM-RSP. When the available period elapses after the distribution of the common key, the common key becomes invalid. The base station 100 transmits the PKM-RSP by the use of, for example, a DL-burst of a radio frame.

The mobile station 200 registers the common key received from the base station 100 in a table. In addition, the mobile station 200 stores a frame number of the radio frame in which the PKM-RSP is included. This frame number is referred to for determining timing at which the common key is updated. After that, the mobile station 200 communicates with the base station 100 by the use of the common key registered in the table. A common key for an uplink and a common key for a downlink which are distinct from each other may be prepared.

(Step S15) When the mobile station 200 determines that it is timing to update the common key, the mobile station 200 transmits a PKM-REQ by which a request to distribute a common key is made to the base station 100. This is the same with step S13. Key update timing will be described later in detail.

(Step S16) The base station 100 generates a common key and updates the table. The base station 100 then transmits a PKM-RSP including the common key to the mobile station 200. This is the same with step S14. The mobile station 200 updates the table by the use of the common key received from the base station 100. After that, the mobile station 200 communicates with the base station 100 by the use of the common key after the update.

When the connection is established, the base station 100 and the mobile station 200 agree in this way on the cryptographic algorithm to be used and the information added to each MAC-PDU. The base station 100 then distributes a common key in response to a request from the mobile station 200. After that, the base station 100 and the mobile station 200 change the common key on a regular or irregular basis.

In the above sequence the base station 100 distributes a common key in response to a request from the mobile station 200. However, the mobile station 200 may determine a common key to be used in response to a request from the base station 100. Furthermore, even if the mobile station 200 does not make a request, the base station 100 may distribute a common key automatically.

Figure 10:
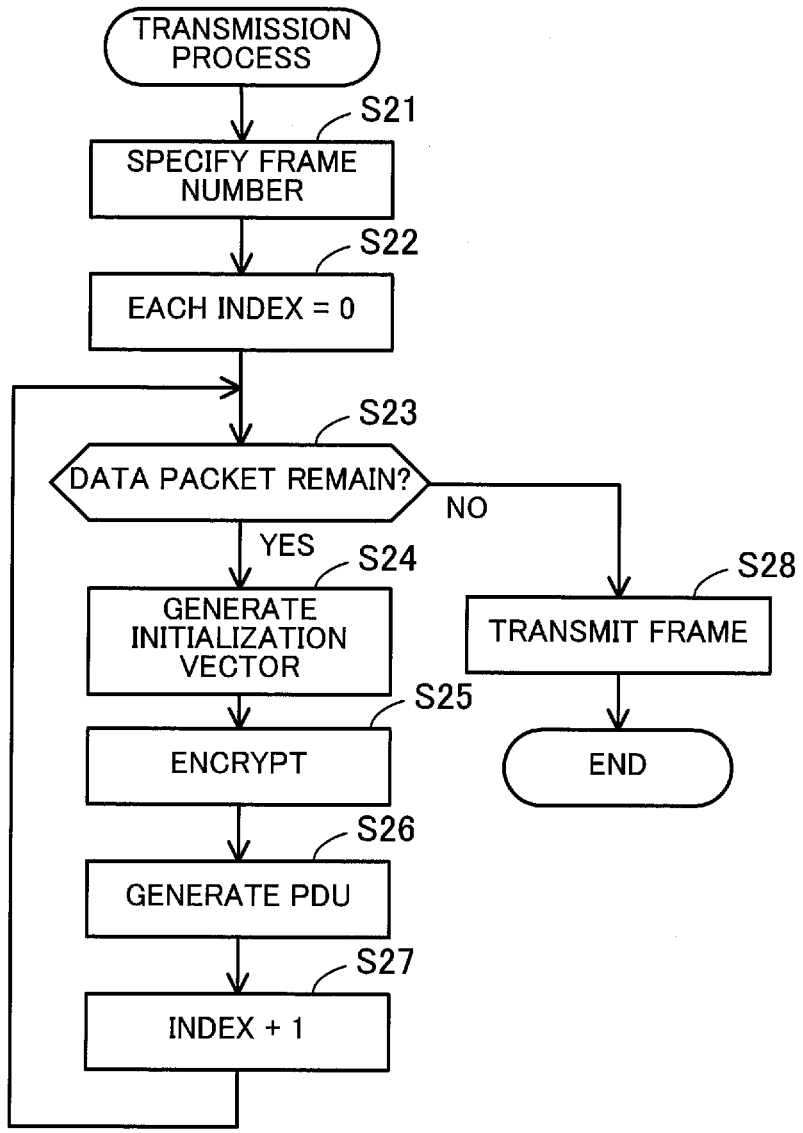
FIG. 10 is a flow chart of a packet transmission process.

FIG. 10 is a flow chart of a packet transmission process. It is assumed that the base station 100 transmits a MAC-PDU. However, the same applies to the case where the mobile station 200 transmits a MAC-PDU. The process illustrated in FIG. 10 will now be described in order of step number.

(Step S21) The control unit 126 specifies a frame number of a radio frame to be transmitted next.

(Step S22) The control unit 126 initializes all the indices in the key management table 125a stored in the table storage unit 125 to zero.

(Step S23) The control unit 126 determines whether a data packet to be transmitted by the next radio frame remains in the packet buffer 120. If there is a remaining data packet, then step S24 is performed. If there is no remaining data packet, then step S28 is performed.

(Step S24) The PDU generation unit 121 acquires the data packet from the packet buffer 120 and specifies a CID corresponding to a destination of the data packet. The encryption unit 121a acquires the frame number specified in step S21 and a common key and an index corresponding to the specified CID from the control unit 126. The encryption unit 121a then generates an initialization vector from the frame number and the index. A method for generating the initialization vector will be described later in detail.

(Step S25) The encryption unit 121a divides the data packet into message blocks the bit length of which corresponds to a cryptographic algorithm to be used. The encryption unit 121a then generates an ICV, which is authentication data, by the use of the message blocks. The encryption unit 121a then encrypts the message blocks and the ICV by the use of the common key and the initialization vector. The generation of the ICV may be omitted. Furthermore, the ICV may not be encrypted.

(Step S26) The PDU generation unit 121 encapsulates the data packet (payload) and the ICV encrypted in step S25 to generate a MAC-PDU. For example, the PDU generation unit 121 adds a MAC header and a CRC to the payload and the ICV.

(Step S27) The control unit 126 increments the index corresponding to the CID specified in step S24 (adds one to the index corresponding to the CID specified in step S24) and updates the key management table 125a. Step S23 is then performed.

(Step S28) The sending unit 124 transmits a signal in which the MAC-PDU that is generated in step S26, that is coded by the coding unit 122, and that is modulated by the modulation unit 123 is mapped to a DL-Burst of the radio frame.

Thus the base station 100 generates an initialization vector from a frame number of a radio frame to be used for transmission and an index for each data packet and encrypts it by the use of the initialization vector and a common key distributed in advance to the mobile station 200. A unique value of initialization vector is used to each data packet, so a decrease in safety caused by the repetitive use of the same common key can be prevented. Furthermore, a frame number is used for generating an initialization vector, so it is easy to generate the initialization vector and to make the mobile station 200 reproduce the initialization vector used.

FIG. 11 illustrates a first example of an initialization vector. In this example, the bit length of an initialization vector is 13 bytes (104 bits). This initialization vector may be referred to as a nonce. The initialization vector includes a 5-byte MAC header, a 4-byte determined value (reserved value), a 3-byte frame number, and a 1-byte index.

The MAC header is the same as that added to a MAC-PDU. With this MAC header, however, the 1-byte HCS for error detection included in the MAC header added to a MAC-PDU is removed. The determined value is a fixed bit string. For example, the determined value is a bit string (represented as 0x00000000 by hexadecimal notation) in which all bits are zero. The frame number is a frame number of a radio frame used for transmitting a data packet encrypted. The index is a number which indicates the order in which a MAC-PDU appears in a radio frame and which is defined in each connection.

An initialization vector is generated by combining the above four kinds of bit strings. However, various modifications of the order in which the above four kinds of bit strings are arranged are possible. Furthermore, various modifications of the above bit lengths are possible.

Figure 12:
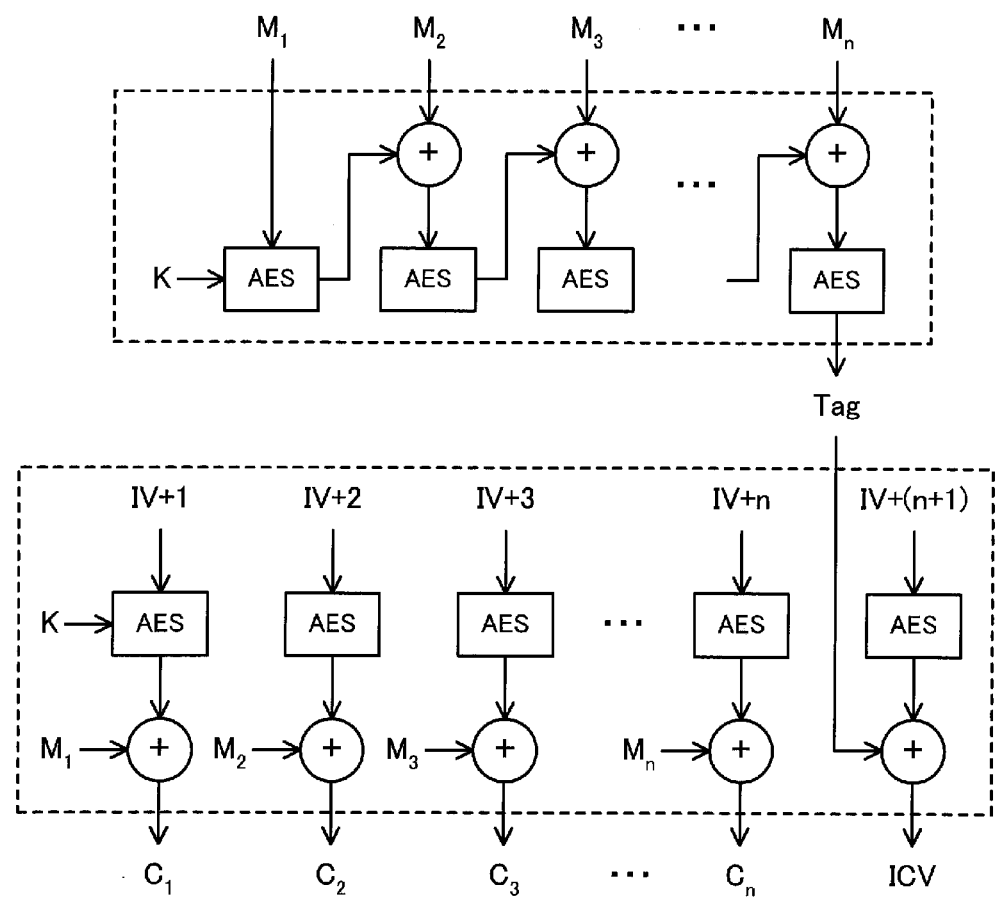
FIG. 12 illustrates an example of an encryption method.

FIG. 12 illustrates an example of an encryption method. FIG. 12 illustrates a concrete example of the encryption performed in the above step S25. In this embodiment, as stated above, AES-CCM is used as a cryptograph processing method. That is to say, an ICV is generated by the use of the CBC mode and a data packet is encrypted by the use of the counter mode.

First the data packet is divided into determined-bit-length message blocks $M_1$ through $M_n$. A common key K is used next for generating authentication data in the CBC mode. That is to say, the leading message block $M_1$ is encrypted by AES. An exclusive-OR operation is performed between an encryption result and the message block $M_2$ and an operation result is encrypted by AES. Similarly, the process of performing an exclusive-OR operation between an encryption result at the preceding stage and the message block $M_k$ and encrypting an operation result by AES is repeated. Finally, an exclusive-OR operation is performed between an encryption result at the preceding stage and the last message block $M_n$ and an operation result is encrypted by AES. By doing so, Tag is found. Tag is authentication data before encryption.

After that, an initialization vector IV and the common key K are used for encrypting the message blocks $M_1$ through $M_n$ and Tag in the counter mode. That is to say, (IV+1) obtained by incrementing IV is encrypted by AES. An exclusive-OR operation is performed between an encryption result and the leading message block $M_1$ to find an encrypted block $C_1$. Similarly, (IV+k) obtained by incrementing IV one by one is encrypted by AES and an exclusive-OR operation is performed between an encryption result and the message block $M_k$. By doing so, an encrypted block $C_k$ is found. After the last message block $M_n$ is encrypted, finally (IV+(n+1)) is encrypted by AES and an exclusive-OR operation is performed between an encryption result and Tag. By doing so, an encrypted ICV is found.

A combination of the encrypted blocks $C_1$ through $C_n$ obtained in this way is a payload of a MAC-PDU. Tag may be used as an ICV without being encrypted. Furthermore, different common keys may be used in the CBC mode and the counter mode. In addition, the message blocks $M_1$ through $M_n$ may be encrypted sequentially or the whole or part of the message blocks $M_1$ through $M_n$ may be encrypted in parallel. Moreover, the generation of Tag and the encryption of the message blocks $M_1$ through $M_n$ may be performed in parallel.

Figure 13:
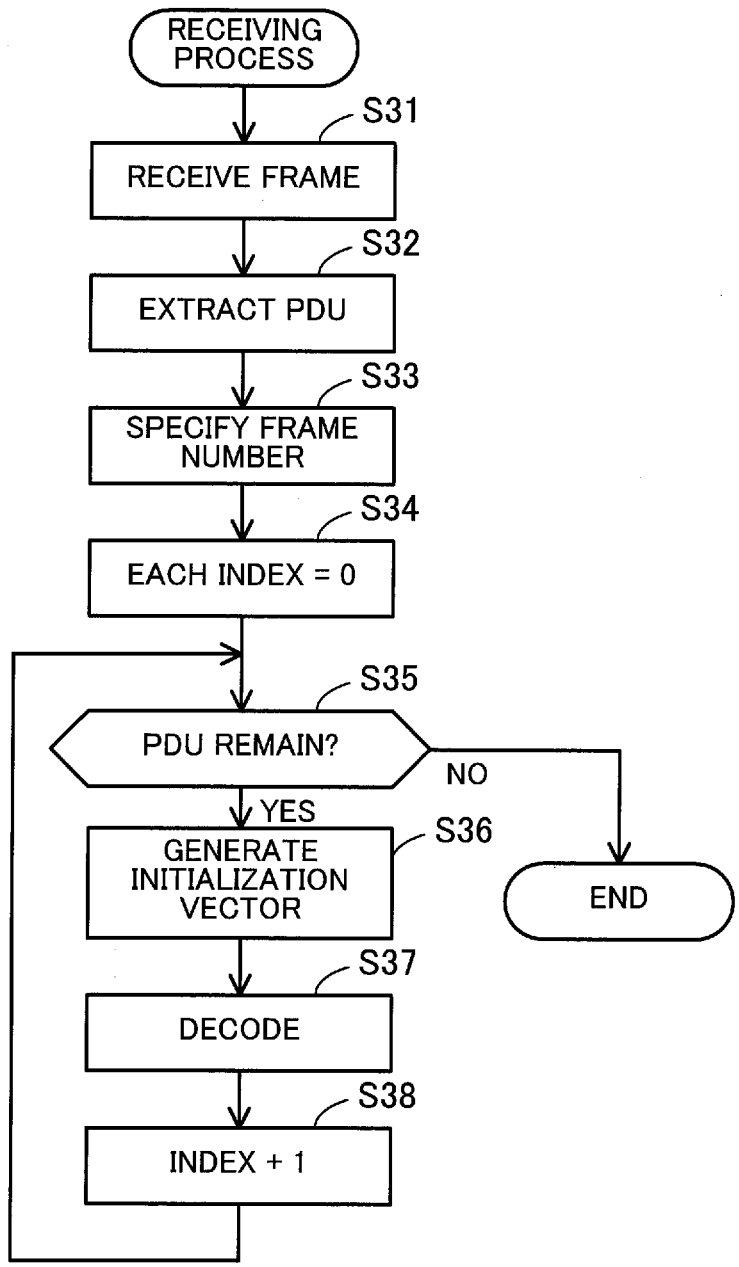
FIG. 13 is a flow chart of a packet receiving process.

FIG. 13 is a flow chart of a packet receiving process. It is assumed that the mobile station 200 receives a MAC-PDU. However, the same applies to the case where the base station 100 receives a MAC-PDU. The process illustrated in FIG. 13 will now be described in order of step number.

(Step S31) The receiving unit 213 receives a radio frame.

(Step S32) The demodulation unit 214 demodulates a DL-Burst included in the radio frame received in step S31, and the decoding unit 215 decodes the DL-Burst. The control information extraction unit 216 extracts a MAC-PDU the destination of which is the mobile station 200.

(Step S33) The control unit 226 acquires a DL-MAP from the control information extraction unit 216 and specifies a frame number of the radio frame received in step S31. Instead of using a frame number included in the DL-MAP, however, the control unit 226 may count a frame number of the radio frame.

(Step S34) The control unit 226 initializes an index in a key management table (which is the same as the key management table 125a) stored in the table storage unit 225 to zero.

(Step S35) The packet reproduction unit 217 determines whether, of MAC-PDUs included in the radio frame received in step S31, there is a MAC-PDU which is not yet decoded. If there is a MAC-PDU which is not yet decoded, then step S36 is performed. If there is no MAC-PDU which is not yet decoded, then the receiving process terminates.

(Step S36) The packet reproduction unit 217 specifies a CID corresponding to a data packet acquired from the control information extraction unit 216. A decoding unit 217a acquires the frame number specified in step S33 and a common key and an index corresponding to the specified CID from the control unit 226. The decoding unit 217a then generates an initialization vector from the frame number and the index. The same initialization vector generation method that is used at the time of encryption is adopted.

(Step S37) The decoding unit 217a divides a payload of a MAC-PDU into encrypted blocks the bit length of which corresponds to a cryptographic algorithm to be used. The decoding unit 217a then decodes the encrypted blocks and an ICV by the use of the common key acquired in step S36 and the initialization vector generated in step S36.

After that, the decoding unit 217a uses the ICV for checking whether the payload is falsified or not. However, if an ICV is not added, then integrity is not checked. If the payload passes the check or integrity is not checked, then the packet reproduction unit 217 outputs the data packet obtained to the data processing unit 218.

(Step S38) The control unit 226 increments an index corresponding to the CID specified in step S36 (adds one to an index corresponding to the CID specified in step S36) and updates the key management table. Step S35 is then performed.

Thus the mobile station 200 generates an initialization vector from a frame number of a radio frame and an index for a MAC-PDU the destination of which is the mobile station 200, and decodes the MAC-PDU by the use of the initialization vector and a common key acquired in advance from the base station 100. The frame number is used for generating the initialization vector. Accordingly, the initialization vector used by the base station 100 can be reproduced easily and the amount of information added to the MAC-PDU is reduced.

If an index is added to each MAC-PDU, the control unit 226 has no need to count the number of MAC-PDUs decoded. In this case, the decoding unit 217a can generate the initialization vector by the use of an index added to each MAC-PDU.

Figure 14:
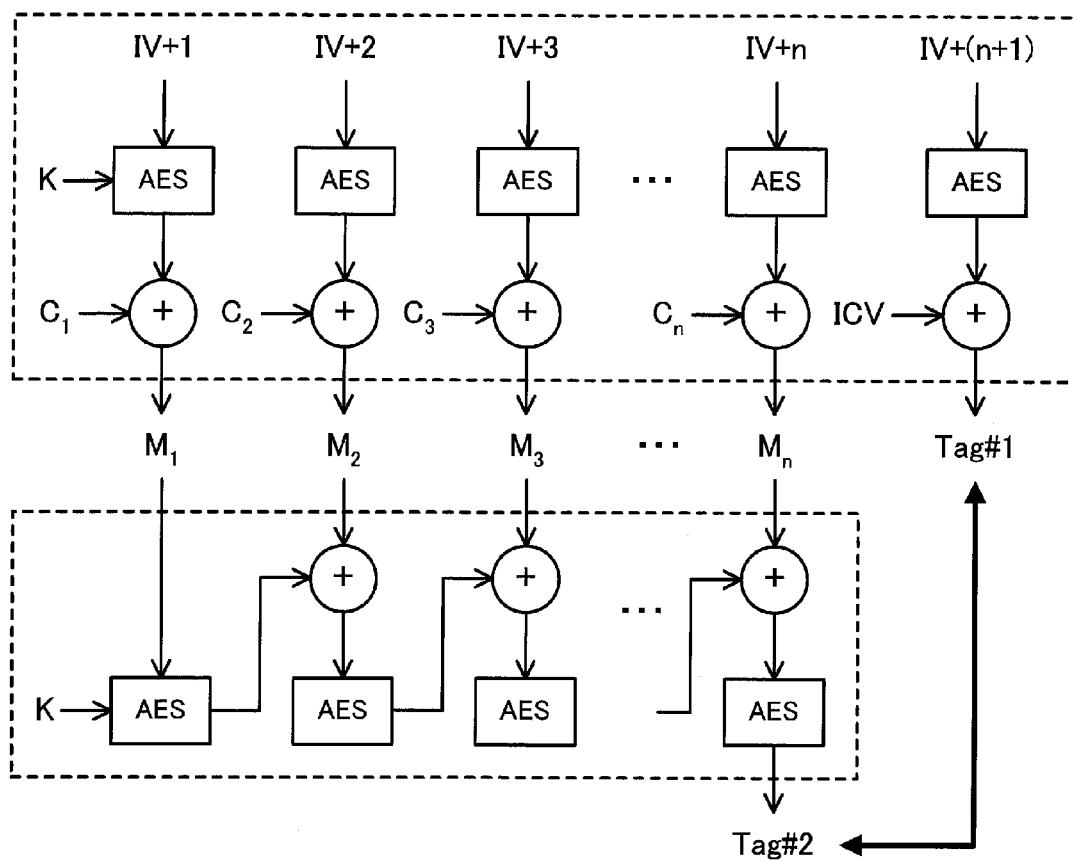
FIG. 14 illustrates an example of a decoding method.

FIG. 14 illustrates an example of a decoding method. FIG. 14 illustrates a concrete example of the decoding performed in the above step S37. In this embodiment, as stated above, AES-CCM is used as a cryptograph processing method. That is to say, a MAC-PDU is decoded by the use of the counter mode and the integrity of a decoding result is checked by the use of the CBC mode.

First a payload of a MAC-PDU is divided into determined-bit-length encrypted blocks $C_1$ through $C_n$. An initialization vector IV and a common key K are used next for decoding the encrypted blocks $C_1$ through $C_n$ and an ICV in the counter mode. That is to say, (IV+1) obtained by incrementing IV is encrypted by AES. An exclusive-OR operation is performed between an encryption result and the leading encrypted block $C_1$ to find a message block M. Similarly, (IV+k) obtained by incrementing IV one by one is encrypted by AES. An exclusive-OR operation is performed between an encryption result and the encrypted block $C_k$ to find a message block $M_k$. The last encrypted block $C_n$ is decoded. (IV+(n+1)) is then encrypted by AES. An exclusive-OR operation is performed between an encryption result and the ICV to find Tag #1.

After that, checking data is generated in the CBC mode from the message blocks $M_1$ through $M_n$ obtained by decoding. That is to say, the leading message block $M_1$ is encrypted by AES. An exclusive-OR operation is performed between an encryption result and the message block $M_2$ and an operation result is encrypted by AES. Similarly, the process of performing an exclusive-OR operation between an encryption result at the preceding stage and the message block $M_k$ and encrypting an operation result by AES is repeated. Finally, an exclusive-OR operation is performed between an encryption result at the preceding stage and the last message block $M_n$ and an operation result is encrypted by AES. By doing so, Tag #2 is found.

If Tag #1 matches Tag #2, then the confirmation that the message blocks $M_1$ through $M_n$ are not falsified is obtained. A combination of the message blocks $M_1$ through $M_n$ obtained is the contents of a data packet. If the ICV is not encrypted, then the ICV and Tag #2 are compared. Different common keys may be used in the CBC mode and the counter mode. In addition, the encrypted blocks $C_1$ through $C_n$ may be decoded sequentially or the whole or part of the encrypted blocks $C_1$ through $C_n$ may be decoded in parallel.

Figure 15:
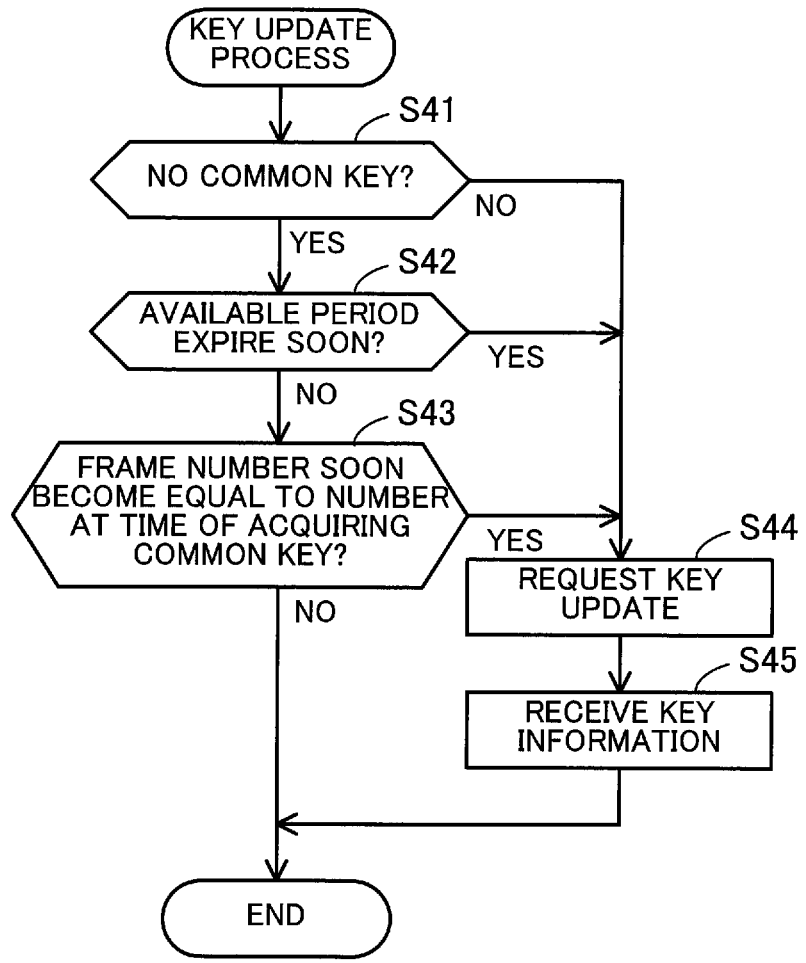
FIG. 15 is a first flow chart of a key update process.

FIG. 15 is a first flow chart of a key update process. It is assumed that the mobile station 200 requests the base station 100 to change a common key. This process is performed repeatedly by the mobile station 200. The process illustrated in FIG. 15 will now be described in order of step number.

(Step S41) The control unit 226 determines whether a common key for a connection currently established has been acquired from the base station 100. For example, when the mobile station 200 newly accesses the base station 100, there is no common key. If there is a common key, then step S42 is performed. If there is no common key, then step S44 is performed.

(Step S42) The control unit 226 compares time which has elapsed after the acquisition of the common key with an available period of which the mobile station 200 is informed by the base station 100 at the time of acquiring the common key, and determines whether the available period expires soon (for example, whether the rest of the available period is shorter than determined time). If the available period does not expire soon, then step S43 is performed. If the available period expires soon, then step S44 is performed.

(Step S43) The control unit 226 compares a frame number at the time of acquiring the common key with a current frame number, and determines whether a frame number soon becomes equal to the number at the time of acquiring the common key (for example, whether the number of radio frames which remain until a frame number becomes equal to the number at the time of acquiring the common key is smaller than a determined number). If a frame number does not soon become equal to the number at the time of acquiring the common key, then the process terminates. If a frame number soon becomes equal to the number at the time of acquiring the common key, then step S44 is performed.

(Step S44) The control unit 226 generates control information (PKM-REQ, for example) for requesting a change in common key and outputs the control information to the PDU generation unit 221. This control information is included in a radio frame and is transmitted to the base station 100.

(Step S45) The control unit 226 acquires control information (PKM-RSP, for example) including a common key and its available period and a frame number of a radio frame including the control information from the control information extraction unit 216. The control unit 226 then registers the common key acquired in the key management table stored in the table storage unit 225, and holds the available period and the frame number acquired.

When the mobile station 200 makes a connection with the base station 100, the mobile station 200 acquires a common key used for encrypting and decoding a data packet from the base station 100 in this way. After that, the mobile station 200 requests the base station 100 before the elapse of an available period designated by the base station 100 to change the common key. Furthermore, before a frame number becomes equal to a number at the time of acquiring the common key even before the elapse of the available period, the mobile station 200 requests the base station 100 to change the common key. This can prevent (for at least a sufficiently long time) a combination of the same common key and the same initialization vector from being used for encrypting a plurality of data packets. The base station 100 may manage the timing at which the common key is updated.

By using the above mobile communication system, each data packet can be encrypted on the basis of a common key and an initialization vector. Accordingly, even if the same common key is used for encrypting a plurality of data packets, a decrease in safety can be prevented.

In this case, an initialization vector is generated by the use of a frame number of a radio frame by which a data packet is transmitted and the order in which the data packet is stored in the radio frame. Therefore, information for reproducing the initialization vector at a receiving end can be removed from information added to the data packet and the amount of communication can be reduced. In addition, the timing at which a common key is updated is related to the timing at which a frame number becomes equal to a number at the time of acquiring the common key. This can prevent a combination of the same common key and the same initialization vector from being used for encrypting a plurality of data packets and increase safety.

Second Embodiment

A second embodiment will now be described in detail with reference to the drawings. Descriptions of the differences between the above first embodiment and a second embodiment will be given and descriptions of the same matters will be omitted. With a mobile communication system according to a second embodiment a common key can be updated more easily in a cycle different from a frame number circulation cycle. Like the mobile communication system according to the first embodiment illustrated in FIG. 2, the mobile communication system according to the second embodiment can be realized by a base station and a mobile station. These base station and mobile station can be realized by the same module structure that is illustrated in FIGS. 3 and 4 respectively. The second embodiment will now be described by the use of the same numerals that are used in FIGS. 3 and 4.

FIG. 16 illustrates a second example of the structure of a key management table. A key management table 125b is stored in a table storage unit 125 of a base station 100. A table which is the same as the key management table 125b is stored in a table storage unit 225 of a mobile station 200. The key management table 125b includes CID, Common Key, Index, and Extension Parameter items. Pieces of information in these items arranged in the horizontal direction are associated with one another.

The meanings of the CID, Common Key, and Index items are the same as those of the CID, Common Key, and Index items, respectively, in the key management table 125a in the first embodiment illustrated in FIG. 5. A value indicative of a range to be extended or shrunk at the time of using as an initialization vector with the bit length (24 bits, for example) of a frame number as reference is set in the Extension Parameter item.

"0" means that a bit string indicative of a frame number is all included in an initialization vector. A negative value means that a frame number shrunk is used, that is to say, part of a bit string is deleted. For example, the value "−2" means that a frame number the 2 highest-order bits of which are deleted is used for generating an initialization vector. In this case, it is possible to make a common key update cycle a fourth of a frame number circulation cycle. A positive value means that a frame number extended is used, that is to say, an extension bit is added to a frame number. A value which is incremented each time the frame number becomes equal to a number at the time of acquiring the common key can be used as an extension bit. For example, the value "4" means that a frame number to which 4 highest-order bits are added is used for generating an initialization vector. In this case, it is possible to make a common key update cycle 16 times a frame number circulation cycle.

If the value of an extension parameter is positive, a value of a current extension bit is also registered in the key management table 125b. For example, when the base station 100 distributes a common key to the mobile station 200, the base station 100 initializes the extension bit to zero. After that, the extension bit is incremented each time a frame number becomes equal after the distribution to the number at the time of acquiring the common key. Each of the base station 100 and the mobile station 200 may manage the current extension bit. Alternatively, one of the base station 100 and the mobile station 200 may manage the current extension bit and inform the other of it on a regular or irregular basis.

By extending or shrinking and using a bit string indicative of a frame number in this way, a common key update cycle can be set more flexibly. The base station 100 can inform the mobile station 200 of an extension parameter as control information. For example, the base station 100 may transmit the PKM-RSP which is illustrated in FIG. 9 and which includes the extension parameter to the mobile station 200. By doing so, the base station 100 informs the mobile station 200 of the extension parameter. The extension parameter can be represented as, for example, a 4-bit integer with a sign.

Figure 17:
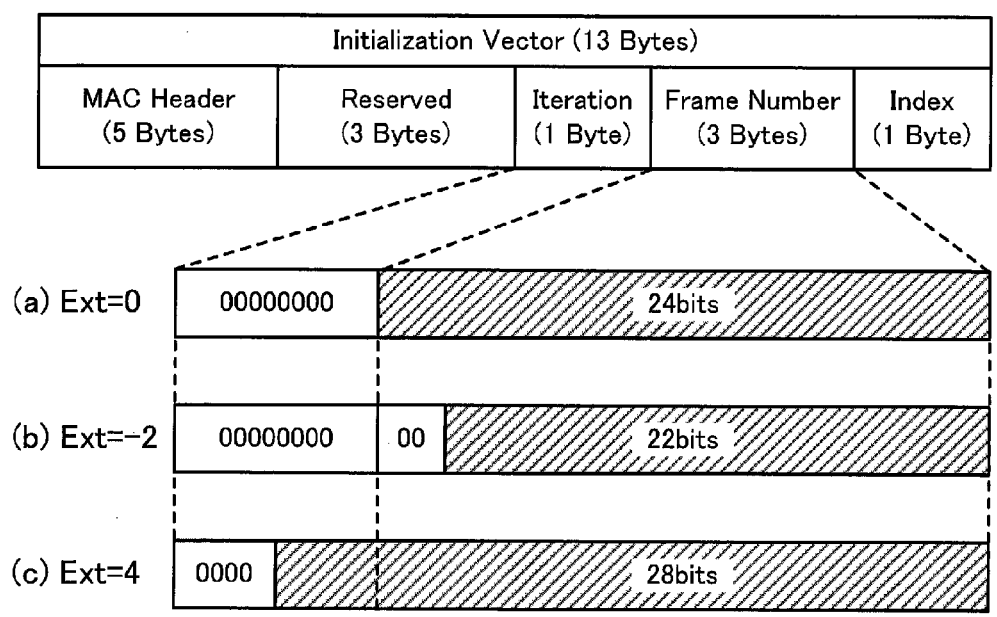
FIG. 17 illustrates a second example of an initialization vector.

FIG. 17 illustrates a second example of an initialization vector. In this example, the bit length of an initialization vector is 13 bytes (104 bits). This initialization vector includes a 5-byte MAC header, a 3-byte determined value (reserved value), a 1-byte iteration count, a 3-byte frame number, and a 1-byte index.

The meanings of the MAC header, the determined value, and the index are the same as those of the MAC header, the determined value, and the index, respectively, included in the initialization vector in the first embodiment illustrated in FIG. 11. The iteration count is a bit string including the above extension bit. In this example, up to eight extension bits can be set. If the number of extension bits is smaller than eight, the remaining bits of the iteration count are set to zero. The frame number is a frame number of a radio frame used for transmitting a data packet encrypted. This is the same with the first embodiment. However, if a frame number shrunk is used, then the highest-order bits corresponding to a portion by which the frame number is shrunk are set to zero.

For example, if an extension parameter is set to "0," all the bits included in a bit string indicative of an iteration count are set to zero and all the bits included in a bit string indicative of a frame number are included in an initialization vector. If an extension parameter is set to "−2," all the bits included in a bit string indicative of an iteration count are set to zero and a bit string indicative of a frame number for the 2 highest-order bits of which zeros are substituted is included in an initialization vector. If an extension parameter is set to "4," the 4 highest-order bits of a bit string indicative of an iteration count are set to zero, the 4 lowest-order bits of the bit string indicative of the iteration count correspond to the number of times a frame number circulates, and all the bits included in a bit string indicative of a frame number are included in an initialization vector.

An initialization vector is generated by combining the above five kinds of bit strings. However, various modifications of the order in which the above five kinds of bit strings are arranged are possible. Furthermore, various modifications of the above bit lengths are possible.

By the way, in some mobile communication systems frame numbers do not match at each timing between adjacent base stations. If the same common key is used before and after handover in this state, then there is a danger that a combination of the common key and a frame number which appears before the handover will appear again after the handover. Accordingly, it is desirable from the viewpoint of safety that a common key to be used should be changed at handover time.

However, if a frame number is extended and used, it is possible to omit a change in common key at handover time without decreasing safety. That is to say, the mobile station 200 changes an extension bit (increments an extension bit, for example) added to the frame number at handover time. By doing so, the frame number is the same, but a different initialization vector is generated. This can prevent a combination of the same common key and the same initialization vector from being used for encrypting a plurality of data packets.

Figure 18:
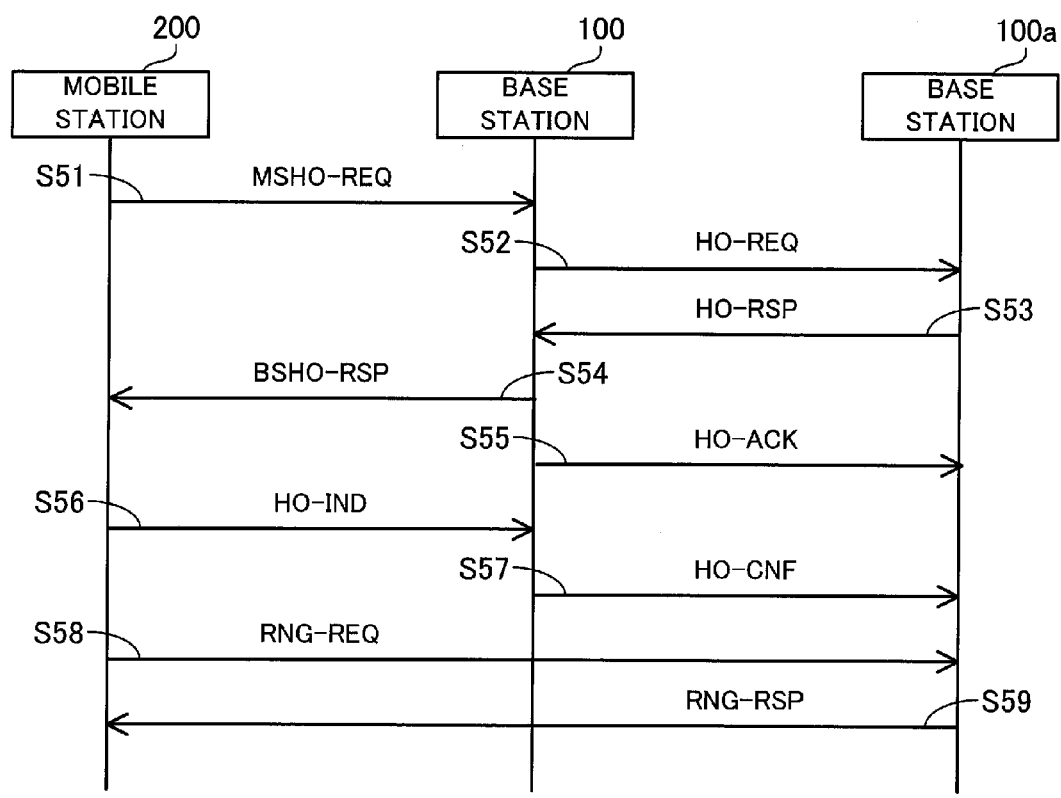
FIG. 18 is a sequence diagram of the flow of handover control.

FIG. 18 is a sequence diagram of the flow of handover control. It is assumed that the mobile station 200 switches a base station with which the mobile station 200 communicates from the base station 100 to a base station 100a. The process illustrated in FIG. 18 will now be described in order of step number.

(Step S51) The mobile station 200 exchanges a radio frame including a MAC-PDU encrypted with the base station 100. It is assumed that receiving power from the base station 100 falls in this state and that the mobile station 200 determines that a base station with which the mobile station 200 makes a connection should be switched. In this case, the mobile station 200 transmits control information (MSHO-REQ) for requesting handover to the base station 100. Current connection information, information regarding the communication capability of the mobile station 200, information regarding the result of a search for a surrounding base station, and the like can be included in the MSHO-REQ. The mobile station 200 transmits the MSHO-REQ by the use of, for example, a UL-burst of a radio frame.

(Step S52) The base station 100 generates control information (HO-REQ) on the basis of information included in the MSHO-REQ received from the mobile station 200, and transmits the HO-REQ to the base station 100*a* which is a candidate move destination. There may be a plurality of candidate move destinations.

(Step S53) The base station 100*a* transmits control information (HO-RSP) to the base station 100 as a response to the HO-REQ received from the base station 100. Information indicative of a connection condition, such as whether the base station 100*a* can establish a connection with the mobile station 200, whether the base station 100*a* can guarantee QoS, or whether the base station 100*a* can exercise high-speed handover control, can be included in the HO-RSP.

(Step S54) The base station 100 generates control information (BSHO-RSP) on the basis of the HO-RSP received from the base station 100*a*, and transmits the BSHO-RSP to the mobile station 200. Information indicative of a connection condition, such as whether the base station 100*a* can guarantee QoS, can be included in the BSHO-RSP. The base station 100 transmits the BSHO-RSP by the use of, for example, a DL-burst of a radio frame.

(Step S55) The base station 100 transmits control information (HO-ACK) indicative of the confirmation that the base station 100 has received the HO-RSP to the base station 100*a*. The message in step S54 and the message in step S55 can be transmitted in any order.

(Step S56) The mobile station 200 determines a move destination base station (base station 100*a*, in this example) on the basis of the BSHO-RSP received from the base station 100, and transmits control information (HO-IND) indicative of the move destination base station to the base station 100. The mobile station 200 transmits the HO-IND by the use of, for example, a UL-burst of a radio frame.

(Step S57) The base station 100 transmits control information (HO-CNF) for giving notice that the mobile station 200 moves to the move destination base station (base station 100*a*) designated in the HO-IND received from the mobile station 200. A common key and an extension bit used by the base station 100 for communicating with the mobile station 200 can be included in the HO-CNF. The extension bit is incremented after handover. The extension bit may be incremented by the base station 100 which is a move source or by the base station 100*a* which is a move destination.

(Step S58) In order to begin to communicate with the base station 100*a*, the mobile station 200 transmits a ranging request (RNG-REQ) to the base station 100*a*. The mobile station 200 transmits the RNG-REQ by the use of, for example, a ranging area of a radio frame.

(Step S59) In response to the RNG-REQ received from the mobile station 200, the base station 100*a* transmits a ranging response (RNG-RSP) to the mobile station 200. A CID used for communication between the base station 100*a* and the mobile station 200 or a flag indicative of whether a common key is changed or not can be included in the RNG-RSP. The base station 100*a* transmits the RNG-RSP by the use of, for example, a DL-burst of a radio frame.

If the base station 100*a* gives the mobile station 200 instructions by the RNG-RSP to change the common key, then the mobile station 200 performs a process for acquiring a common key. On the other hand, if the base station 100*a* gives the mobile station 200 instructions by the RNG-RSP not to change the common key, then the mobile station 200 increments the extension bit used for communicating with the base station 100. The mobile station 200 should update the extension bit before encrypting or decoding a data packet.

By changing (incrementing, for example) the extension bit in this way, the base station 100*a* and the mobile station 200 can continue to use the common key before handover. For example, the base station 100 before the move can inform the base station 100*a* after the move of the extension bit via an upper station. However, the mobile station 200 may inform the base station 100*a* after the move of the extension bit before or after the change.

By adopting the above mobile communication system, the same effect that is achieved by the first embodiment can be obtained. Furthermore, by using the mobile communication system according to the second embodiment, a common key change cycle can easily be set to a cycle different from a frame number circulation cycle. Moreover, the use of an extension bit makes it possible to continue to use the same common key before and after handover without decreasing safety. As a result, a load of a common key change process can be reduced and communication can be resumed rapidly after handover.

Third Embodiment

A third embodiment will now be described in detail with reference to the drawings. Descriptions of the differences between the above first embodiment and a third embodiment will be given and descriptions of the same matters will be omitted. With a mobile communication system according to a third embodiment a common key update timing also depends on the number of data packet encrypted. Like the mobile communication system according to the first embodiment illustrated in FIG. 2, the mobile communication system according to the third embodiment can be realized by a base station and a mobile station. These base station and mobile station can be realized by the same module structure that is illustrated in FIGS. 3 and 4 respectively. The third embodiment will now be described by the use of the same numerals that are used in FIGS. 3 and 4.

FIG. 19 illustrates a third example of the structure of a key management table. A key management table 125*c* is stored in a table storage unit 125 of a base station 100. A table which is the same as the key management table 125*c* is stored in a table storage unit 225 of a mobile station 200. The key management table 125*c* includes CID, Common Key, Index, and PDU Number items. Pieces of information in these items arranged in the horizontal direction are associated with one another.

The meanings of the CID, Common Key, and Index items are the same as those of the CID, Common Key, and Index items, respectively, in the key management table 125*a* in the first embodiment illustrated in FIG. 5. The number of MAC-PDUs for which a common key is used is set in the PDU Number item. When a common key is acquired, a number set in the PDU Number item is initialized to zero. Each time the common key is used for encrypting or decoding, a number set in the PDU Number item is incremented.

It is assumed that a large number of MAC-PDUs are transmitted or received in a short period of time for a connection. Even before a frame number becomes equal to a number at the time of acquiring a common key, it is desirable from the viewpoint of safety that a common key should be changed earlier. Accordingly, a maximum PDU number may be set in advance as an upper limit on the continuous use of the same common key. The base station 100 can inform the mobile station 200 of the maximum PDU number as control information. For example, the base station 100 may transmit the PKM-RSP which is illustrated in FIG. 9 and which includes the maximum PDU number to the mobile station 200. By doing so, the base station 100 informs the mobile station 200 of the maximum PDU number. The maximum PDU number can be represented as, for example, a 4-byte (32-bit) integer.

Figure 20:
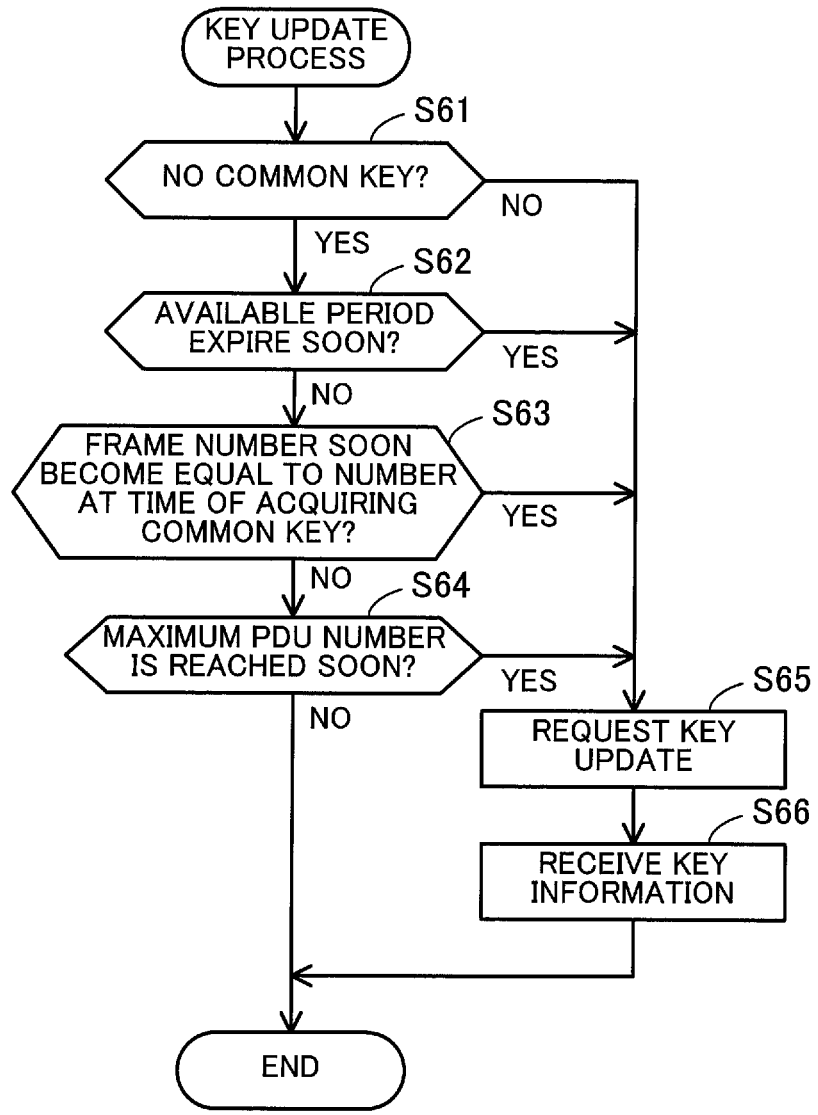
FIG. 20 is a second flow chart of a key update process.

FIG. 20 is a second flow chart of a key update process. It is assumed that the mobile station 200 requests the base station 100 to change a common key. This process is performed repeatedly by the mobile station 200. The process illustrated in FIG. 20 will now be described in order of step number.

(Step S61) A control unit 226 determines whether a common key for a connection currently established has been acquired from the base station 100. If there is a common key, then step S62 is performed. If there is no common key, then step S65 is performed.

(Step S62) The control unit 226 compares time which has elapsed after the acquisition of the common key with an available period of which the mobile station 200 is informed by the base station 100 at the time of acquiring the common key, and determines whether the available period expires soon. If the available period does not expire soon, then step S63 is performed. If the available period expires soon, then step S65 is performed.

(Step S63) The control unit 226 compares a frame number at the time of acquiring the common key with a current frame number, and determines whether a frame number soon becomes equal after the acquisition of the common key to a number at the time of acquiring the common key. If a frame number does not soon become equal to the number at the time of acquiring the common key, then step S64 is performed. If a frame number soon becomes equal to the number at the time of acquiring the common key, then step S65 is performed.

(Step S64) The control unit 226 compares the number of PDUs encrypted or decoded by the use of the current common key with a maximum PDU number of which the mobile station 200 is informed by the base station 100, and determines whether the maximum PDU number is reached soon (for example, whether the difference between the maximum PDU number and the current PDU number is smaller than a determined number). If the maximum PDU number is not reached soon, then the process terminates. If the maximum PDU number is reached soon, then step S65 is performed.

(Step S65) The control unit 226 generates control information (PKM-REQ, for example) for requesting a change in common key and outputs the control information to a PDU generation unit 221. This control information is included in a radio frame and is transmitted to the base station 100.

(Step S66) The control unit 226 acquires control information (PKM-RSP, for example) including a common key, its available period, and a maximum PDU number and a frame number of a radio frame including the control information from a control information extraction unit 216. The control unit 226 then registers the common key acquired in the key management table stored in the table storage unit 225, and resets the PDU number. In addition, the control unit 226 holds the available period and the frame number acquired.

Before the number of times a common key is used reaches an upper limit, the mobile station 200 requests the base station 100 in this way, even before the elapse of an available period designated by the base station 100 and the return of a frame number to a number at the time of acquiring a common key, to change a common key. As a result, a decrease in safety caused in the case of a large number of MAC-PDUs being transmitted or received in a short period of time can be prevented. The base station 100 may manage the timing at which the common key is updated.

By adopting the above mobile communication system, the same effect that is achieved by the first embodiment can be obtained. Furthermore, by using the mobile communication system according to the third embodiment, it is possible to make common key update timing depend on the number of times a common key is used. As a result, the safety of encryption communication can be increased further. An embodiment obtained by combining the second embodiment and the third embodiment is possible.

According to the above sending apparatus, receiving apparatus, sending method, and receiving method, the amount of communication performed at the time of an encrypted data packet being transmitted or received can be controlled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A sending apparatus for transmitting a frame including one or more data packets, the apparatus comprising:
   an encryption unit which encrypts each of the data packets on the basis of a cryptographic key and an initialization vector that is generated from a frame number of the frame to be transmitted, the initialization vector selectively including either a shrunken bit series obtained by replacing a specified number of high-order bits of the frame number with zeros, or an extended bit series obtained by adding to the frame number a specified number of counter bits indicating how many times the frame number has circulated, wherein the number of high-order bits to be replaced and the number of counter bits to be added are programmable with parameters, and wherein the cryptographic key is changed in each circulation cycle of the shrunken bit series or extended bit series that is selected; and
   a sending unit which transmits the frame including the data packets encrypted by the encryption unit.

2. The sending apparatus according to claim 1, wherein the encryption unit makes the initialization vector include a position of a data packet in the frame.

3. The sending apparatus according to claim 2, wherein the sending unit adds an index indicative of the position of the data packet to the data packet and transmits the data packet.

4. The sending apparatus according to claim 1, wherein the encryption unit changes the cryptographic key before a number of data packets encrypted by the use of the cryptographic key reaches a determined number.

5. A receiving apparatus comprising:
   a receiving unit which receives a frame including one or more encrypted data packets; and
   a decoding unit which decodes each of the data packets included in the received frame on the basis of a decoding key and an initialization vector that is generated from a frame number of the received frame, the initialization vector selectively including either a shrunken bit series obtained by replacing a specified number of high-order bits of the frame number with zeros, or an extended bit series obtained by adding to the frame number a specified number of counter bits indicating how many times the frame number has circulated, wherein the number of high-order bits to be replaced and the number of counter bits to be added are programmable with parameters, and wherein the decoding key is changed in each circulation cycle of the shrunken bit series or extended bit series that is selected.

6. The receiving apparatus according to claim 5, wherein the decoding unit makes the initialization vector include a position of a data packet in the frame.

7. The receiving apparatus according to claim 6, wherein:
an index indicative of the position of the data packet in the frame is added to the data packet; and
the decoding unit generates the initialization vector by the use of the index added to the data packet.

8. The receiving apparatus according to claim 5, wherein the decoding unit changes the decoding key before a number of data packets decoded by the use of the decoding key reaches a determined number.

9. A transmission method by a sending apparatus for transmitting a frame including one or more data packets, the method comprising:
generating an initialization vector from a frame number of the frame to be transmitted, the initialization vector selectively including either a shrunken bit series obtained by replacing a specified number of high-order bits of the frame number with zeros, or an extended bit series obtained by adding to the frame number a specified number of counter bits indicating how many times the frame number has circulated, wherein the number of high-order bits to be replaced and the number of counter bits to be added are programmable with parameters;
encrypting each of the data packets on the basis of the generated initialization vector and a cryptographic key that is changed in each circulation cycle of the shrunken bit series or extended bit series that is selected; and
transmitting the frame including the data packets encrypted.

10. A receiving method by a receiving apparatus comprising:
receiving a frame including one or more encrypted data packets;
generating an initialization vector from a frame number of the received frame, the initialization vector selectively including either a shrunken bit series obtained by replacing a specified number of high-order bits of the frame number with zeros, or an extended bit series obtained by adding to the frame number a specified number of counter bits indicating how many times the frame number has circulated, wherein the number of high-order bits to be replaced and the number of counter bits to be added are programmable with parameters; and
decoding each of the data packets included in the frame received on the basis of the generated initialization vector and a decoding key that is changed in each circulation cycle of the shrunken bit series or extended bit series that is selected.

* * * * *